(12) United States Patent
Li et al.

(10) Patent No.: US 11,659,045 B2
(45) Date of Patent: May 23, 2023

(54) DATA TRANSMISSION METHOD AND APPARATUS, AND READABLE STORAGE MEDIUM

(71) Applicant: Huawei Technologies Co., Ltd., Shenzhen (CN)

(72) Inventors: Xiaojuan Li, Beijing (CN); Yanzhao He, Beijing (CN); Guowei Ouyang, Beijing (CN); Hui Jin, Beijing (CN); Fenghui Dou, Beijing (CN); Haorui Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 17/053,298

(22) PCT Filed: Jan. 31, 2019

(86) PCT No.: PCT/CN2019/074053
§ 371 (c)(1),
(2) Date: Nov. 5, 2020

(87) PCT Pub. No.: WO2019/214300
PCT Pub. Date: Nov. 14, 2019

(65) Prior Publication Data
US 2021/0194970 A1 Jun. 24, 2021

(30) Foreign Application Priority Data
May 9, 2018 (CN) .......................... 201810437098.5

(51) Int. Cl.
*H04L 45/02* (2022.01)
*H04L 67/141* (2022.01)
(Continued)

(52) U.S. Cl.
CPC ............ *H04L 67/141* (2013.01); *H04L 45/02* (2013.01); *H04L 45/74* (2013.01); *H04W 40/24* (2013.01)

(58) Field of Classification Search
CPC ....... H04L 67/141; H04L 45/02; H04L 45/74; H04W 40/24
See application file for complete search history.

(56) References Cited

U.S. PATENT DOCUMENTS 9,806,984 B1 * 10/2017 Tolstoy ................. H04L 45/745
2018/0097894 A1    4/2018 Li et al.
(Continued)

FOREIGN PATENT DOCUMENTS

| CN | 101789904 A | 7/2010 |
| WO | 2017147271 A1 | 8/2017 |
| WO | 2018038490 A1 | 3/2018 |

OTHER PUBLICATIONS

3GPP TS 24.501 V1.0.0, Mar. 2018, "3rd Generation Partnership Project; Technical Specification Group Core Network and Terminals; Non-Access-Stratum (NAS) protocol for 5G System (5GS); Stage 3 (Release 15)," 253 pages.
(Continued)

*Primary Examiner* — Jonathan A Bui
*Assistant Examiner* — Kidest Mendaye
(74) *Attorney, Agent, or Firm* — Conley Rose, P.C.

(57) ABSTRACT

A data transmission method includes obtaining a user equipment route selection policy (USRP) rule parameter of a started application, establishing a first protocol data unit (PDU) session corresponding to the started application with a network device through the modem module when no PDU session parameter matching the URSP rule parameter exists in the mapping table, adding an interface name of the first PDU session to the routing table, adding a mapping relationship between the session parameter of the first PDU
(Continued)

session and the interface name of the first PDU session to the mapping table, and routing to-be-transmitted data of the started application to the first PDU session by using the interface name of the first PDU session.

20 Claims, 7 Drawing Sheets

(51) Int. Cl.
    *H04W 40/24*     (2009.01)
    *H04L 45/74*     (2022.01)

(56) References Cited

U.S. PATENT DOCUMENTS

| | | | |
|---|---|---|---|
| 2018/0098272 A1 | 4/2018 | Jones et al. | |
| 2019/0306752 A1* | 10/2019 | Lai | H04W 28/0925 |
| 2020/0053562 A1* | 2/2020 | Kim | H04W 12/062 |
| 2021/0120596 A1* | 4/2021 | Youn | H04W 8/08 |
| 2021/0152615 A1* | 5/2021 | Karampatsis | H04W 40/22 |

OTHER PUBLICATIONS

Huawei, "Setting PDU session ID and S-NSSAI during PDU session establishment upon mobility from EPS to 5GS," 3GPP TSG-CT WG1 Meeting #109, C1-181357, Montreal (Canada), Feb. 26-Mar. 2, 2018, 4 pages.

Huawei, et al, "23.501:OI8a URSP update: DNN and PDU type," SA WG2 Meeting #123, S2-177159, Oct. 23-27, 2017, Ljubljana, Slovenia, 3 pages.

C1-180609, Samsung, "Update UE-requested PDU session establishment procedure regarding S-NSSAI," 3GPP TSG-CT WG1 Meeting #108, Gothenburg (Sweden), Jan. 22-26, 2018, 4 pages. XP051382180.

C1-181726, Nokia et al, "Processing multiple route selection descriptors in a URSP rule," 3GPP TSG-CT WG1 Meeting #109, Montreal (Canada), Feb. 26-Mar. 2, 2018, 3 pages. XP051393241.

S2-183008, Huawei, et al, "Additional POU Session Type In Route Selection Descriptor," 3GPP TSG-SA2 Meeting #126, Montreal, Canada, Feb. 26-Mar. 2, 2018, 4 pages. XP051408891.

S2-184184, Qualcomm Incorporated et al., Support use of DNN for URSP traffic descriptor, 3GPP TSG-SA WG2 Meeting #127, Sanya, P.R. China, Apr. 16-20, 2018, 7 pages. XP051432949.

\* cited by examiner

DATA TRANSMISSION METHOD AND APPARATUS, AND READABLE STORAGE MEDIUM

CROSS-REFERENCE TO RELATED APPLICATIONS

This application is a U.S. National Stage of International Patent Application No. PCT/CN2019/074053, filed on Jan. 31, 2019, which claims priority to Chinese Patent Application No. 201810437098.5, filed on May 9, 2018. Both of the aforementioned applications are hereby incorporated by reference in their entireties.

TECHNICAL FIELD

This application relates to the field of communications technologies, and in particular, to a data transmission method and apparatus, and a readable storage medium.

BACKGROUND

With rapid development of communications technologies, a user equipment route selection policy (user equipment route selection policy, URSP) is introduced into a fifth-generation (fifth-generation, 5G) mobile communications technology network. The URSP includes related information such as a traffic filter application identifier, seamless offload, slice information, a continuity type, a data network name, or an access type, and may provide policy information for a terminal, so that the terminal implements data transmission.

In a current stage, a specific method for implementing data transmission by a terminal according to a URSP is as follows: A core network obtains, from a policy control function (policy control function, PCF), a URSP that a terminal needs to comply with, and provides the URSP for the terminal, so that the terminal routes, according to one or more rules in the URSP, data to be sent by an application, including routing the data to an existing established data protocol unit (protocol data unit, PDU) session, or routing the data to a newly established PDU session, to implement data transmission.

However, how a terminal establishes a PDU session according to a URSP is not mentioned in the prior art. Therefore, how a terminal establishes a PDU session according to a URSP is a problem that urgently needs to be resolved.

SUMMARY

This application provides a data transmission method and apparatus, and a readable storage medium, to resolve a problem that how a terminal establishes a PDU session according to a URSP is not mentioned in the prior art.

A first aspect of this application provides a data transmission method. The method is applied to a terminal device. The terminal device includes an application platform module and a modem module. The terminal device stores a mapping table and a routing table. The method includes:

obtaining a user equipment route selection policy URSP rule parameter of a started application;

establishing a first PDU session with a network device through the modem module if no protocol data unit PDU session parameter matching the URSP rule parameter exists in the mapping table, where the first PDU session corresponds to the started application;

adding an interface name of the first PDU session to the routing table;

adding a first mapping relationship to the mapping table, where the first mapping relationship includes a mapping relationship between a session parameter of the first PDU session and the interface name of the first PDU session; and routing to-be-transmitted data of the started application to the first PDU session by using the interface name of the first PDU session.

In this embodiment of this application, the terminal device establishes, based on the URSP rule parameter of the started application, the first PDU session corresponding to the started application, and stores the interface name of the first PDU session and the first mapping relationship. Therefore, the to-be-transmitted data of the started application may be routed to the first PDU session by using the interface name of the first PDU session. This implements data transmission, and provides a solution about how a terminal device establishes a corresponding PDU session based on an obtained URSP rule parameter.

In a possible implementation of the first aspect, the establishing a first PDU session with a network device through the modem module if no protocol data unit PDU session parameter matching the URSP rule parameter exists in the mapping table includes:

The application platform module sends a first establishment request to the modem module when no PDU session parameter matching the URSP rule parameter exists in the mapping table. The first establishment request is used to request to establish the first PDU session. The first establishment request includes an identifier of the started application.

The modem module obtains the URSP rule parameter of the started application based on the identifier of the started application in the first establishment request.

The modem module establishes the first PDU session based on the URSP rule parameter of the started application by interacting with the network device.

The modem module feeds back a first establishment response to the application platform module. The first establishment response is used to indicate that the first PDU session is successfully established. The first establishment response includes the interface name of the first PDU session and the session parameter of the first PDU session.

In this embodiment, when URSP rule information is stored in the application platform module and the modem module, how the application platform module establishes a corresponding PDU session with the network device based on the URSP rule parameter through the modem module is described in detail. An implementation solution is simple and easy to implement, and data transmission efficiency is high.

In the foregoing possible implementation of this application, the adding an interface name of the first PDU session to the routing table, and adding a first mapping relationship to the mapping table includes:

The application platform module adds the interface name of the first PDU session to the routing table based on the received first establishment response, establishes the first mapping relationship, and adds the first mapping relationship to the mapping table.

In this embodiment, based on the first establishment response, the application platform module adds the interface name of the first PDU session to the routing table, establishes the first mapping relationship, and adds the first mapping relationship to the mapping table, thereby laying a foundation for subsequently implementing data transmission.

In another possible implementation of the first aspect, before the obtaining a user equipment route selection policy URSP rule parameter of a started application, the method further includes:

The modem module stores URSP rule information obtained from the network device, and sends the URSP rule information to the application platform module.

The application platform module stores the received URSP rule information.

In this embodiment, after obtaining the URSP rule information, the modem module sends the URSP rule information to the application platform module, and both the application platform module and the modem module store the URSP rule information, thereby improving convenience for subsequently establishing a corresponding PDU session.

In the foregoing possible implementation of this application, the method further includes:

The application platform module sends a second establishment request to the modem module. The second establishment request is used to request to establish a second PDU session. The second PDU session corresponds to an application corresponding to a URSP rule parameter with a highest precedence and/or a default URSP rule parameter in the URSP rule information.

The modem module establishes the second PDU session based on the second establishment request and the URSP rule information by interacting with the network device.

The modem module feeds back a second establishment response to the application platform module. The second establishment response is used to indicate that the second PDU session is successfully established. The second establishment response includes an interface name of the second PDU session and a session parameter of the second PDU session.

Based on the received second establishment response, the application platform module adds the interface name of the second PDU session to the routing table, establishes a second mapping relationship, and adds the second mapping relationship to the mapping table. The second mapping relationship includes a mapping relationship between the session parameter of the second PDU session and the interface name of the second PDU session.

This technical solution describes a solution about how the application platform module and the modem module establish the second PDU session based on the URSP rule information when the URSP rule information is stored in the application platform module and the modem module. The second PDU session corresponds to the application corresponding to the URSP rule parameter with the highest precedence and/or the default URSP rule parameter in the URSP rule information. This resolves a problem that how a terminal establishes a PDU session according to a URSP is not mentioned in the prior art.

In still another possible implementation of the first aspect, the obtaining a user equipment route selection policy URSP rule parameter of a started application includes:

The modem module receives an identifier of the started application that is sent by the application platform module, and obtains the URSP rule parameter of the started application based on the identifier of the started application.

In this embodiment, when the URSP rule information is stored in the modem module, the modem module obtains the URSP rule parameter of the started application.

In the foregoing implementation of the first aspect, the establishing a first PDU session with a network device through the modem module if no protocol data unit PDU session parameter matching the URSP rule parameter exists in the mapping table includes:

When no PDU session parameter matching the URSP rule parameter exists in the mapping table, the modem module establishes the first PDU session based on the URSP rule parameter of the started application by interacting with the network device.

The modem module sends a first notification message to the application platform module. The first notification message is used to indicate that the first PDU session is successfully established. The first notification message includes the interface name of the first PDU session and the session parameter of the first PDU session.

In this technical solution, when the URSP rule information is stored only in the modem module, how the modem module establishes the corresponding first PDU session based on the URSP rule parameter of the started application is described in detail. This provides an implementation possibility for subsequent data transmission of the started application, and enhances security of the URSP rule information by storing the URSP rule information only in the modem module.

In the foregoing possible implementation of the first aspect, the adding an interface name of the first PDU session to the routing table, and adding a first mapping relationship to the mapping table includes:

Based on the received first notification message, the application platform module adds the interface name of the first PDU session to the routing table, establishes the first mapping relationship, and adds the first mapping relationship to the mapping table.

In this embodiment, based on the first notification message, the application platform module adds the interface name of the first PDU session to the routing table, establishes the first mapping relationship, and adds the first mapping relationship to the mapping table, thereby laying a foundation for subsequently implementing data transmission.

In any one of the foregoing possible implementations of the first aspect, before the obtaining a user equipment route selection policy URSP rule parameter of a started application, the method further includes:

The modem module stores URSP rule information obtained from the network device.

In this embodiment, the modem module stores the URSP rule information obtained from the network device, thereby enhancing security of the URSP rule information.

In any one of the foregoing possible implementations of the first aspect, the method further includes:

The modem module establishes a second PDU session based on the URSP rule information by interacting with the network device, and stores a session parameter of the second PDU session. The second PDU session corresponds to an application corresponding to a URSP rule parameter with a highest precedence and/or a default URSP rule parameter in the URSP rule information.

The modem module sends a second notification message to the application platform module. The second notification message is used to indicate that the second PDU session is successfully established. The second notification message includes an interface name of the second PDU session and the session parameter of the second PDU session.

Based on the received second notification message, the application platform module adds the interface name of the second PDU session to the routing table, establishes a second mapping relationship, and adds the second mapping relationship to the mapping table. The second mapping relationship includes a mapping relationship between the session parameter of the second PDU session and the interface name of the second PDU session.

This technical solution describes a solution about how the modem module establishes the second PDU session based on the URSP rule information when the URSP rule information is stored only in the modem module, thereby resolving a problem that how a terminal establishes a PDU session according to a URSP is not mentioned in the prior art.

In yet another possible implementation of the first aspect, before the routing to-be-transmitted data of the started application to the first PDU session by using the interface name of the first PDU session, the method further includes:

determining that networking function creation initiated by the started application succeeds.

In this embodiment, initiating a networking function creation request by the terminal device is equivalent to that the terminal device has data to be sent, that is, a channel (that is, a PDU session) that can be used to route or transmit data needs to exist between the terminal device and the network device. Therefore, the terminal device can route the to-be-transmitted data of the started application to the first PDU session based on the interface name of the first PDU session only when the first PDU session corresponding to the started application exists or is successfully established, the interface name of the first PDU session is obtained, and the networking function creation initiated by the started application succeeds. Then the to-be-transmitted data is transmitted to a destination.

In yet another possible implementation of the first aspect, the method further includes:

before the URSP rule parameter of the started application is obtained, receiving a networking function creation request initiated by the started application; and after the interface name of the first PDU session is obtained from the mapping table, determining that the networking function creation initiated by the started application succeeds.

In this embodiment, an occasion at which the started application initiates the networking function creation request may be that the terminal device obtains the URSP rule parameter of the started application, and it needs to be determined, after the terminal device obtains the interface name of the first PDU session from the mapping table, that the networking function creation initiated by the started application succeeds. There are various implementations and many options.

In yet another possible implementation of the first aspect, the method further includes:

after the first mapping relationship is added to the mapping table and before the interface name of the first PDU session is obtained from the mapping table, receiving the networking function creation request initiated by the started application; and after the interface name of the first PDU session is obtained from the mapping table, determining that the networking function creation initiated by the started application succeeds.

In this embodiment, an occasion at which the started application initiates the networking function creation request may be after the terminal device adds the first mapping relationship to the mapping table and before the terminal device obtains the interface name of the first PDU session from the mapping table, and after the terminal device obtains the interface name of the first PDU session from the mapping table, it is determined that the networking function creation initiated by the started application succeeds. Therefore, a comparatively short time is consumed from initiating the networking function creation request by the started application to successful networking function creation.

In yet another possible implementation of the first aspect, the method further includes:

determining whether a PDU session parameter matching the URSP rule parameter exists in the mapping table; and when a PDU session parameter matching the URSP rule parameter exists in the mapping table, determining that the first PDU session exists.

In this embodiment, after obtaining the URSP rule parameter of the started application, the terminal device needs to determine whether a PDU session parameter matching the URSP rule parameter of the started application exists in the mapping table, and when a PDU session parameter matching the URSP rule parameter of the started application exists, determines that the first PDU session exists, thereby improving data transmission efficiency.

In the foregoing possible implementation of the first aspect, the determining whether a PDU session parameter matching the URSP rule parameter exists in the mapping table includes:

sequentially matching URSP rule parameters of the started application with a PDU session parameter in the mapping table in descending order of precedences of the URSP rule parameters, and determining, from the URSP rule parameters, a rule parameter matching the PDU session parameter in the mapping table, or determining that no rule parameter matching the PDU session parameter in the mapping table exists in the URSP rule parameters.

In this embodiment, the started application may have a plurality of rule parameters. In this case, the rule parameters need to be matched with the PDU session parameter in the mapping table one by one to determine whether a PDU session parameter matching a URSP rule parameter of the started application exists in the mapping table. Determining accuracy is high.

In yet another possible implementation of the first aspect, before the obtaining a URSP rule parameter of a started application, the method further includes:

if a seamless offload indication parameter in parameter information of the started application has a highest precedence, routing the to-be-transmitted data of the started application to a wireless local area network WLAN.

When the seamless offload indication parameter in the parameter information of the started application has the highest precedence, the to-be-transmitted data of the started application may be directly routed to the WLAN. This simplifies a PDU session setup process, and an implementation is simple.

A second aspect of this application provides a data transmission apparatus. The apparatus is applied to a terminal device. The terminal device stores a mapping table and a routing table. The apparatus includes an application platform module and a modem module.

The application platform module is configured to obtain a user equipment route selection policy URSP rule parameter of a started application.

The modem module is configured to establish a first PDU session through a network device when no protocol data unit PDU session parameter matching the URSP rule parameter exists in the mapping table. The first PDU session corresponds to the started application.

The application platform module is configured to: add an interface name of the first PDU session to the routing table, add a first mapping relationship to the mapping table, and route to-be-transmitted data of the started application to the first PDU session by using the interface name of the first PDU session. The first mapping relationship includes a mapping relationship between a session parameter of the first PDU session and the interface name of the first PDU session.

In a possible implementation of the second aspect, the application platform module is further configured to send a first establishment request to the modem module when no PDU session parameter matching the URSP rule parameter exists in the mapping table. The first establishment request is used to request to establish the first PDU session. The first establishment request includes an identifier of the started application.

The modem module is specifically configured to: obtain the URSP rule parameter of the started application based on the identifier of the started application in the first establishment request, establish the first PDU session based on the URSP rule parameter of the started application by interacting with the network device, and return a first establishment response to the application platform module. The first establishment response is used to indicate that the first PDU session is successfully established. The first establishment response includes the interface name of the first PDU session and the session parameter of the first PDU session.

In the foregoing possible implementation of the second aspect, that the application platform module is configured to add an interface name of the first PDU session to the routing table and add a first mapping relationship to the mapping table is specifically as follows:

The application platform module is configured to: based on the received first establishment response, add the interface name of the first PDU session to the routing table, establish the first mapping relationship, and add the first mapping relationship to the mapping table.

In another possible implementation of the second aspect, the modem module is further configured to: before the application platform module obtains the user equipment route selection policy URSP rule parameter of the started application, store URSP rule information obtained from the network device, and send the URSP rule information to the application platform module.

The application platform module is further configured to store the received URSP rule information.

In the foregoing possible implementation of the second aspect, the application platform module is further configured to send a second establishment request to the modem module. The second establishment request is used to request to establish a second PDU session. The second PDU session corresponds to an application corresponding to a URSP rule parameter with a highest precedence and/or a default URSP rule parameter in the URSP rule information.

The modem module is further configured to establish the second PDU session based on the second establishment request and the URSP rule information by interacting with the network device.

The modem module is further configured to feed back a second establishment response to the application platform module. The second establishment response is used to indicate that the second PDU session is successfully established. The second establishment response includes an interface name of the second PDU session and a session parameter of the second PDU session.

The application platform module is configured to: based on the received second establishment response, add the interface name of the second PDU session to the routing table, establish a second mapping relationship, and add the second mapping relationship to the mapping table. The second mapping relationship includes a mapping relationship between the session parameter of the second PDU session and the interface name of the second PDU session.

In still another possible implementation of the second aspect, the application platform module is further configured to: before routing the to-be-transmitted data of the started application to the first PDU session by using the interface name of the first PDU session, determine that networking function creation initiated by the started application succeeds.

In yet another possible implementation of the second aspect, the application platform module is further configured to: before obtaining the URSP rule parameter of the started application, receive a networking function creation request initiated by the started application, and after obtaining the interface name of the first PDU session from the mapping table, determine that the networking function creation initiated by the started application succeeds.

In yet another possible implementation of the second aspect, the application platform module is further configured to: after adding the first mapping relationship to the mapping table and before obtaining the interface name of the first PDU session from the mapping table, receive a networking function creation request initiated by the started application, and after obtaining the interface name of the first PDU session from the mapping table, determine that the networking function creation initiated by the started application succeeds.

In yet another possible implementation of the second aspect, the application platform module is further configured to determine whether a PDU session parameter matching the URSP rule parameter exists in the mapping table, and when a PDU session parameter matching the URSP rule parameter exists in the mapping table, determine that the first PDU session exists.

In the foregoing possible implementation of the second aspect, that the application platform module is configured to determine whether a PDU session parameter matching the URSP rule parameter exists in the mapping table is specifically as follows:

The application platform module is configured to: sequentially match URSP rule parameters of the started application with a PDU session parameter in the mapping table in descending order of precedences of the URSP rule parameters, and determine, from the URSP rule parameters, a rule parameter matching the PDU session parameter in the mapping table, or determine that no rule parameter matching the PDU session parameter in the mapping table exists in the URSP rule parameters.

In yet another possible implementation of the second aspect, the application platform module is further configured to: before obtaining the URSP rule parameter of the started application, route the to-be-transmitted data of the started application to a wireless local area network WLAN if it is determined that a seamless offload indication parameter in parameter information of the started application has a highest precedence.

A third aspect of this application provides a data transmission apparatus. The apparatus is applied to a terminal device. The terminal device stores a mapping table and a routing table. The apparatus includes an application platform module and a modem module.

The modem module is configured to: obtain a user equipment route selection policy URSP rule parameter of a started application, establish a first PDU session through a network device when no protocol data unit PDU session parameter matching the URSP rule parameter exists in the mapping table, and send an interface name of the first PDU session and a session parameter of the first PDU session to the application platform module.

The application platform module is configured to: receive the interface name of the first PDU session and the session parameter of the first PDU session that are sent by the modem module, add the interface name of the first PDU session to the routing table, add a first mapping relationship to the mapping table, and route to-be-transmitted data of the started application to the first PDU session by using the interface name of the first PDU session. The first mapping relationship includes a mapping relationship between the session parameter of the first PDU session and the interface name of the first PDU session.

In a possible implementation of the third aspect, that the modem module is configured to obtain a user equipment route selection policy URSP rule parameter of a started application is specifically as follows:

The modem module is configured to: receive an identifier of the started application that is sent by the application platform module, and obtain the URSP rule parameter of the started application based on the identifier of the started application.

In another possible implementation of the third aspect, the modem module is further configured to: when no PDU session parameter matching the URSP rule parameter exists in the mapping table, establish the first PDU session based on the URSP rule parameter of the started application by interacting with the network device, and send a first notification message to the application platform module. The first notification message is used to indicate that the first PDU session is successfully established. The first notification message includes the interface name of the first PDU session and the session parameter of the first PDU session.

In the foregoing possible implementation of the third aspect, that the application platform module is configured to add the interface name of the first PDU session to the routing table and add a first mapping relationship to the mapping table is specifically as follows:

The application platform module is configured to: based on the received first notification message, add the interface name of the first PDU session to the routing table, establish the first mapping relationship, and add the first mapping relationship to the mapping table.

In still another possible implementation of the third aspect, the modem module is further configured to: before the user equipment route selection policy URSP rule parameter of the started application is obtained, store URSP rule information obtained from the network device.

In the foregoing possible implementation of the third aspect, the modem module is further configured to: establish a second PDU session based on the URSP rule information by interacting with the network device, store a session parameter of the second PDU session, and send a second notification message to the application platform module. The second notification message is used to indicate that the second PDU session is successfully established. The second notification message includes an interface name of the second PDU session and the session parameter of the second PDU session. The second PDU session corresponds to an application corresponding to a URSP rule parameter with a highest precedence and/or a default URSP rule parameter in the URSP rule information.

The application platform module is configured to: based on the received second notification message, add the interface name of the second PDU session to the routing table, establish a second mapping relationship, and add the second mapping relationship to the mapping table. The second mapping relationship includes a mapping relationship between the session parameter of the second PDU session and the interface name of the second PDU session.

In yet another possible implementation of the third aspect, the application platform module is further configured to: before routing the to-be-transmitted data of the started application to the first PDU session by using the interface name of the first PDU session, determine that networking function creation initiated by the started application succeeds.

In yet another possible implementation of the third aspect, the application platform module is further configured to: before obtaining a URSP rule parameter of a started application, receive a networking function creation request initiated by the started application, and after obtaining the interface name of the first PDU session from the mapping table, determine that the networking function creation initiated by the started application succeeds.

In yet another possible implementation of the third aspect, the application platform module is further configured to: after adding the first mapping relationship to the mapping table and before obtaining the interface name of the first PDU session from the mapping table, receive a networking function creation request initiated by the started application, and after obtaining the interface name of the first PDU session from the mapping table, determine that the networking function creation initiated by the started application succeeds.

In yet another possible implementation of the third aspect, the modem module is further configured to: determine whether a PDU session parameter matching the URSP rule parameter exists in the mapping table, and when a PDU session parameter matching the URSP rule parameter exists in the mapping table, determine that the first PDU session exists.

In the foregoing possible implementation of the third aspect, that the modem module is further configured to determine whether a PDU session parameter matching the URSP rule parameter exists in the mapping table is specifically as follows:

The modem module is further configured to: sequentially match URSP rule parameters of the started application with a PDU session parameter in the mapping table in descending order of precedences of the URSP rule parameters, and determine, from the URSP rule parameters, a rule parameter matching the PDU session parameter in the mapping table, or determine that no rule parameter matching the PDU session parameter in the mapping table exists in the URSP rule parameters.

In yet another possible implementation of the third aspect, the modem module is further configured to: before the URSP rule parameter of the started application is obtained, route the to-be-transmitted data of the started application to a wireless local area network WLAN if it is determined that a seamless offload indication parameter in parameter information of the started application has a highest precedence.

A fourth aspect of this application provides a data transmission apparatus. The apparatus may be integrated into a terminal device. The apparatus includes an application platform and a modem. The application platform may correspond to the application platform module in the first aspect. The modem may correspond to the modem module in the first aspect.

In a possible implementation, the application platform and the modem each may include a processor and a transceiver; or processing functions of the application platform and the modem are integrated into a processor, and sending and receiving functions of the application platform and the modem are integrated into a transceiver.

A fifth aspect of this application provides a readable storage medium. The readable storage medium stores an instruction. When the instruction is run on a computer, the computer is enabled to perform the data transmission method in the first aspect.

A sixth aspect of this application provides a chip for running an instruction. The chip is configured to perform the data transmission method in the first aspect.

In the foregoing aspects, when the terminal device obtains the URSP rule parameter of the started application and no PDU session parameter matching the URSP rule parameter exists in the mapping table of the terminal device, the terminal device establishes, with the network device through the modem module, the first PDU session corresponding to the started application; adds the interface name of the first PDU session to the routing table; adds, to the mapping table, the first mapping relationship including the mapping relationship between the session parameter of the first PDU session and the interface name of the first PDU session; and routes the to-be-transmitted data of the started application to the first PDU session by using the interface name of the first PDU session. This implements data transmission, describes in detail a solution about how a terminal device establishes a corresponding PDU session based on an obtained URSP rule parameter, and resolves a problem that how a terminal establishes a PDU session according to a URSP is not mentioned in the prior art.

DESCRIPTION OF EMBODIMENTS

Figure 1:
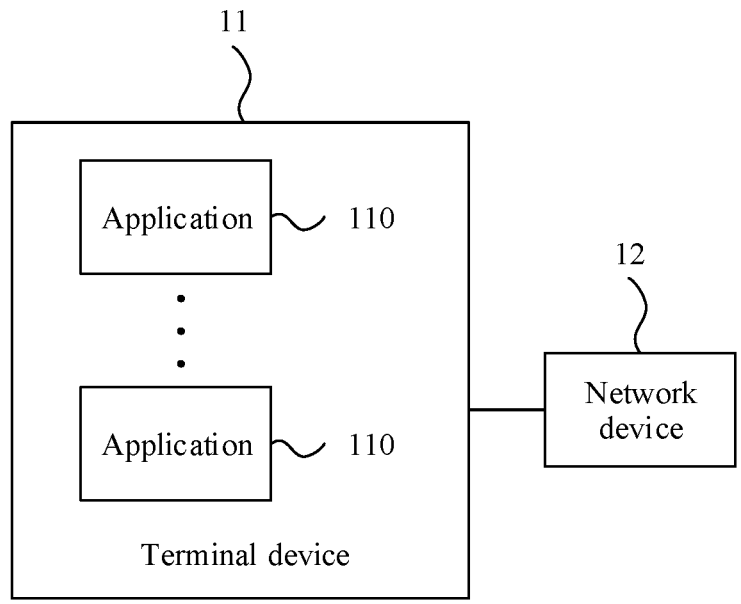
FIG. 1 is a schematic structural diagram of a communications system according to an embodiment of this application.

A data transmission method provided in the following embodiments of this application is applicable to a communications system. FIG. 1 is a schematic structural diagram of a communications system according to an embodiment of this application. As shown in FIG. 1, the communications system may include at least one terminal device 11 and at least one network device 12. FIG. 1 shows one terminal device and one network device as examples. In the communications system in the embodiment shown in FIG. 1, a plurality of applications 110 are installed on the terminal device 11. The plurality of applications 110 are a plurality of application programs running on the terminal device 11. The terminal device 11 may route, based on policy information provided by the network device, data to be sent by an application. Optionally, the communications system is not limited to including the network device and the terminal device, and may further include another network entity such as a network controller or a mobility management entity. This is not limited in this embodiment of this application.

The embodiments of this application may be applied to communications systems, may be a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a General Packet Radio Service (General Packet Radio Service, GPRS) system, a Long Term Evolution (Long Term Evolution, LTE) system, an LTE Frequency Division Duplex (Frequency Division Duplex, FDD) system, an LTE Time Division Duplex (Time Division Duplex, TDD) system, a Universal Mobile Telecommunications System (Universal Mobile Telecommunication System, UMTS), and another wireless communications system that uses an orthogonal frequency division multiplexing (Orthogonal Frequency Division Multiplexing, OFDM) technology. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In this embodiment of this application, the terminal device 11 may also be referred to as user equipment (user equipment, UE), a mobile station (mobile station, MS), a mobile terminal (mobile terminal), a terminal (terminal), or the like. The terminal device 11 may communicate with one or more core networks by using a radio access network (radio access network, RAN). For example, the terminal device 11 may be a mobile phone (or referred to as a "cellular" phone) or a computer with a mobile terminal. A specific manifestation form of the terminal device is not specifically limited in this embodiment of this application.

The network device 12 in this embodiment of this application may be configured to provide a wireless communication function for the terminal device 11. The base station may include a macro base station, a micro base station (also referred to as a small cell), a relay station, an access point, and the like in various forms. The network device 12 may be a base transceiver station (base transceiver station, BTS) in GSM or CDMA, or may be a NodeB (nodeB, NB) in WCDMA, or may be an evolved NodeB (evolutional node B, eNB or e-NodeB) in LTE, or may be a corresponding device gNB on a 5G network. For ease of description, in all the embodiments of this application, all the foregoing apparatuses that provide a wireless communication function for the terminal device 11 are referred to as a network device 12.

In the embodiments of this application, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following first briefly describes an applicable scenario of the embodiments of this application.

Optionally, user equipment route selection policy (user equipment route selection policy, URSP) rule information is introduced into a 5G network. To be specific, a 5G core network provides, for a terminal device by using a policy control function (policy control function, PCF), policy rule information that the terminal device needs to comply with. In this way, the terminal device routes, according to one or more rules in the URSP rule information, data to be sent by an application, including routing the data to an existing established protocol data unit (protocol data unit, PDU) session, or triggering establishment of a new PDU session. The URSP rule information may include the following content:

"traffic filter (traffic filter): an application identifier (app ID)": indicating an application to which the rule is applicable;

seamless offload (non-seamless offload): indicating whether a PDU session corresponding to an application can be offloaded (offload) to a wireless local area network (wireless local area networks, WLAN);

slice information (slice info): used to indicate one or more slices (S-NSSAI(s)) supported by a PDU session corresponding to an application;

a continuity type (continuity types, CT): used to indicate a session continuity mode (SSC mode) that can be used by a PDU session corresponding to an application;

a data network name (DNN): information about a data network name (data network name, DNN) supported by a PDU session corresponding to the application; and an access type (access type, AT): indicating an access type of a PDU session corresponding to the application.

Parameter information in the URSP rule information may have different names with evolution of a network architecture and emergence of a new service scenario, but has a same meaning. A name may be further modified in a subsequent new service scenario. However, provided that a meaning of names remains unchanged, the names indicate a same parameter.

For example, the traffic filter (traffic filter) is changed to a traffic descriptor (traffic descriptor);

the seamless offload (non-seamless offload) is changed to a seamless offload indication (non-seamless offload indication);

the slice information (slice info) is changed to network slice selection (network slice selection);

the continuity type (continuity types, CT) is changed to session continuity mode selection (SSC mode selection);

the data network name (DNN) is changed to data network name selection (DNN selection); and the access type (access type, AT) is changed to an access type preference (access type preference).

In addition, a route selection descriptor (route selection descriptor) is further added in a new service scenario to describe a route selection component.

The route selection descriptor (route selection descriptor) includes parameters such as a seamless offload indication (non-seamless offload indication), network slice selection (network slice selection), session continuity mode selection (SSC mode selection), data network name selection (DNN selection), and an access type preference (access type preference).

In addition, a URSP rule precedence (rule precedence) and a route selection descriptor precedence (route selection descriptor precedence) are added in a new service scenario to describe a precedence of a URSP rule and a precedence of a route selection descriptor, respectively.

A URSP rule includes a rule precedence (rule precedence), a traffic descriptor (traffic descriptor), and one or more route selection descriptors (route selection descriptor). The route selection descriptor (route selection descriptor) further includes parameters such as a route selection descriptor precedence (route selection descriptor precedence), a seamless offload indication (non-seamless offload indication), network slice selection (network slice selection), session continuity mode selection (SSC mode selection), data network name selection (DNN selection), and an access type preference (access type preference).

The network slice selection (network slice selection), the session continuity mode selection (SSC mode selection), the data network name selection (DNN selection), and the access type preference (access type preference) are 5G PDU session parameters, and are used for matching with an existing PDU session or establishing a new PDU session.

In addition, if a route selection descriptor (route selection descriptor) includes a offless download indication (non-seamless offload indication), the route selection descriptor (route selection descriptor) does not include network slice selection (network slice selection), session continuity mode selection (SSC mode selection), data network name selection (DNN selection), or an access type preference (access type preference).

It can be learned from the foregoing content that, in the prior art, only content included in the URSP rule information is defined, and how the terminal device stores the URSP rule information and how the terminal device establishes a PDU session based on the URSP rule information are not mentioned. In view of this, the embodiments of this application provide a data transmission method and apparatus, and a readable storage medium, to resolve a problem about how a terminal device stores a URSP and how the terminal device establishes a PDU session according to the URSP.

Figure 2:
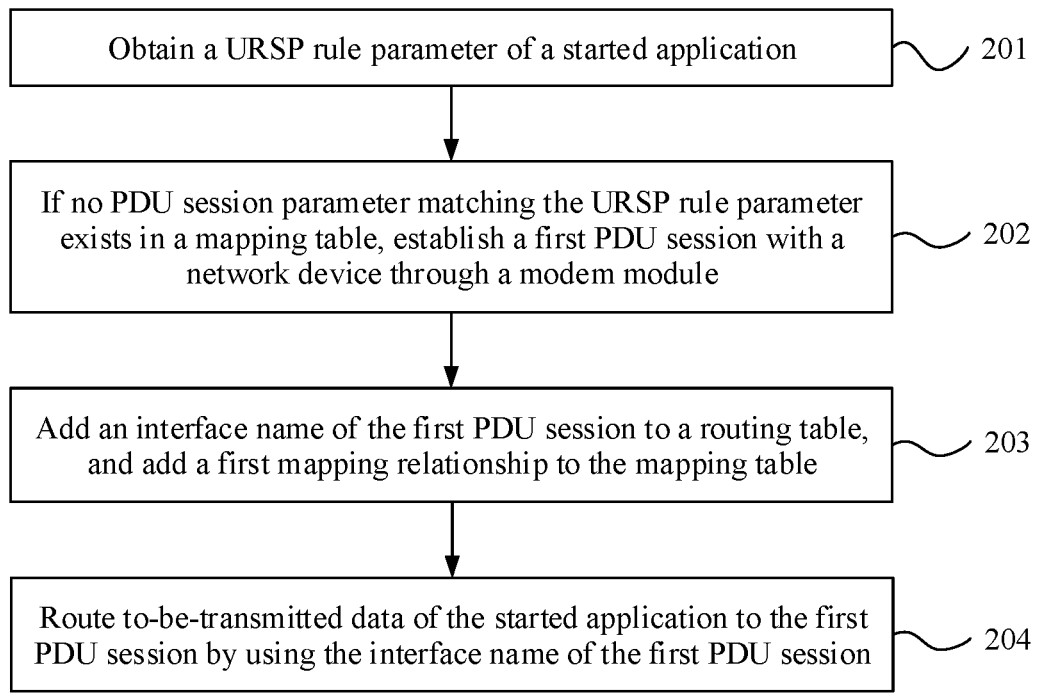
FIG. 2 is a schematic flowchart of Embodiment 1 of a data transmission method according to an embodiment of this application.

FIG. 2 is a schematic flowchart of Embodiment 1 of a data transmission method according to an embodiment of this application. The data transmission method provided in this embodiment of this application is applied to a terminal device. The terminal device includes an application platform module and a modem module. The terminal device stores a mapping table and a routing table. As shown in FIG. 2, the data transmission method may include the following steps.

Step 201: Obtain a URSP rule parameter of a started application.

Optionally, because URSP rule information is introduced into a 5G network, when the started application on the terminal device needs to transmit data, the terminal device may first obtain the URSP rule parameter of the started application, and then determine, based on the URSP rule parameter, whether to establish a PDU session. The PDU session is an association established between the terminal device and a data network that is used to provide a PDU connectivity service.

Optionally, in a specific implementation, the URSP rule parameter of the started application may be obtained by using the application platform module in the terminal device or the modem module in the terminal device, and whether the URSP rule parameter of the started application is obtained by using the application platform module or the modem module may be determined depending on different storage locations of URSP rule information obtained by the terminal device from a network device. This is described in detail in the following embodiments, and details are not described herein.

Optionally, in this embodiment of this application, starting of the started application includes: A user clicks an application icon so that an application program corresponding to the application icon starts running, automatic running of some application programs on the terminal device, a state in which an application program runs in the foreground or the background, or the like. A specific manifestation form of the started application is not limited in this embodiment of this application.

Optionally, it can be learned from the foregoing descriptions that the URSP rule parameter may include a traffic descriptor, a seamless offload indication, network slice selection, session continuity mode selection, a data network name, an access type, a route selection descriptor, or the like. Specific content included in the URSP rule parameter is not limited in this embodiment, and may vary with different network structures and application scenarios.

Optionally, in an implementation possibility, before the URSP rule parameter of the started application is obtained, if a seamless offload indication parameter in parameter information of the started application has a highest precedence, to-be-transmitted data of the started application is routed to a wireless local area network (wireless local area networks, WLAN).

Specifically, a parameter with a highest precedence is obtained from the parameter information of the started application. In an aspect, when the seamless offload indication parameter in the parameter information has the highest precedence, it indicates that the to-be-transmitted data of the started application can be offloaded to a WLAN. Therefore, in this case, the to-be-transmitted data of the started application may be directly routed to the WLAN. In another aspect, on the 5G network, if a URSP rule parameter of a PDU session parameter in the parameter information of the started application has a highest precedence, the URSP rule parameter of the started application is obtained, that is, parameter information in a highest rule in the URSP rule parameter is obtained.

Step 202: If no PDU session parameter matching the URSP rule parameter exists in the mapping table, establish a first PDU session with the network device through the modem module.

The first PDU session corresponds to the started application.

Optionally, the terminal device stores the mapping table and the routing table. The mapping table stores a correspondence between a session parameter of an established PDU session and a URSP rule parameter, and a mapping relationship between a session parameter of an established PDU session and an interface name of the established PDU session parameter. The routing table stores information such as an interface name of an established PDU session.

In this embodiment, after obtaining the URSP rule parameter of the started application, the terminal device needs to determine whether a PDU session of the started application exists. Optionally, in this embodiment, the PDU session of the started application may be defined as the first PDU session. In other words, the first PDU session corresponds to the started application.

Optionally, the terminal device searches the mapping table based on the obtained URSP rule parameter of the started application; determines whether a PDU session parameter matching the URSP rule parameter exists in the mapping table; and if a PDU session parameter matching the URSP rule parameter exists in the mapping table, it indicates that the first PDU session already exists; otherwise, it indicates that the first PDU session does not exist.

Optionally, a specific implementation step of determining whether a PDU session parameter matching the URSP rule parameter exists in the mapping table is as follows:

Sequentially match URSP rule parameters of the started application with a PDU session parameter in the mapping table in descending order of precedences of the URSP rule parameters, and determine, from the URSP rule parameters, a rule parameter matching the PDU session parameter in the mapping table, or determine that no rule parameter matching the PDU session parameter in the mapping table exists in the URSP rule parameters.

Specifically, a rule parameter with a highest precedence in the URSP rule parameters of the started application is first obtained; the rule parameter is matched with the PDU session parameter in the mapping table; and if the matching succeeds, it is considered that the first PDU session corresponding to the started application exists; otherwise, a rule parameter with a second highest precedence in the URSP rule parameters is obtained, and the rule parameter is matched with the PDU session parameter in the mapping table, until a rule parameter matching the PDU session parameter in the mapping table is determined in the URSP rule parameters, or until none of rule parameters in the URSP rule parameters can match the PDU session parameter in the mapping table, where in this case, the first PDU session corresponding to the started application needs to be established with the network device through the modem module.

Optionally, in this embodiment, because the first PDU session is established based on the URSP rule parameter of the started application, that the URSP rule parameter matches a PDU session parameter means that, if a rule parameter in the URSP rule parameter has only one value, a value of the PDU session parameter needs to be the same as the value of the rule parameter in the URSP rule parameter; or if a rule parameter in the URSP rule parameter has a plurality of values, a value of the PDU session parameter is one of the plurality of values of the rule parameter in the URSP rule parameter.

When the first PDU session does not exist in the terminal device, the terminal device interacts with the network device through the modem module to establish the first PDU session. Specifically, the modem module sends a PDU session establishment request to the network device, where the PDU session establishment request carries the URSP rule parameter of the started application; and further, the network device establishes the first PDU session based on the URSP rule parameter of the started application, and then returns a PDU session establishment response to the modem module after the first PDU is successfully established, to notify the terminal device that the first PDU session is successfully established.

Step 203: Add an interface name of the first PDU session to the routing table, and add a first mapping relationship to the mapping table.

The first mapping relationship includes a mapping relationship between a session parameter of the first PDU session and the interface name of the first PDU session.

Optionally, in this embodiment, after the first PDU session corresponding to the started application is successfully established, the interface name of the first PDU session is added to the routing table of the terminal device. In this way, when the started application subsequently needs to transmit data, the terminal device may directly obtain the interface name of the first PDU session from the routing table.

In this embodiment, after the first PDU session of the started application is successfully established, to conveniently determine, based on the URSP rule parameter of the started application when data subsequently needs to be transmitted, that the first PDU session already exists, and conveniently obtain the interface name of the first PDU session, the first mapping relationship may be added to the mapping table of the terminal device, where the first mapping relationship includes the mapping relationship between the session parameter of the first PDU session and the interface name of the first PDU session.

Optionally, a session parameter of a PDU session may include content such as network slice selection information, session continuity mode selection information, and data network name selection information.

Step 204: Route to-be-transmitted data of the started application to the first PDU session by using the interface name of the first PDU session.

In this embodiment, when determining that the first PDU session of the started application is successfully established and obtaining the interface name of the first PDU session, the terminal device routes the to-be-transmitted data of the started application to the first PDU session based on an interface address corresponding to the interface name of the first PDU session, and then the first PDU session directs and forwards the to-be-transmitted data to a destination address.

Optionally, routing is a process of receiving a data packet from an interface, and directing and forwarding the data packet to another interface based on a destination address of the data packet, or directing and forwarding the data packet to an application server based on a destination address of the data packet.

Therefore, in this embodiment, before routing the to-be-transmitted data of the started application to the first PDU session by using the interface name of the first PDU session, the terminal device further needs to determine that networking function creation initiated by the started application succeeds.

Optionally, initiating a networking function creation request by the terminal device is equivalent to that the terminal device has data to be sent, that is, a channel (that is, a PDU session) that can be used to route or transmit data needs to exist between the terminal device and the network device. Therefore, the terminal device can route the to-be-transmitted data of the started application to the first PDU session based on the interface name of the first PDU session only when the first PDU session corresponding to the started application exists or is successfully established, and the interface name of the first PDU session is obtained. Then the to-be-transmitted data is transmitted to a destination.

Optionally, in this embodiment of this application, the started application initiates the networking function creation request at different occasions.

In a possible implementation, before obtaining the URSP rule parameter of the started application, the terminal device receives the networking function creation request initiated by the started application. Correspondingly, after obtaining the interface name of the first PDU session from the mapping table, the terminal device determines that the networking function creation initiated by the started application succeeds.

In this embodiment, the started application initiates the networking function creation request before the terminal device determines whether the first PDU session corresponding to the started application exists, or the networking function creation request may be initiated when the application is being started. Correspondingly, the terminal device determines that the networking function creation initiated by the started application succeeds only after determining that the first PDU session corresponding to the started application exists or the first PDU session corresponding to the started application is established, and obtaining the interface name of the first PDU session from the mapping table; and returns a response indicating that the networked function creation succeeds to the started application.

In other words, in this embodiment, the terminal device determines whether the first PDU session corresponding to the started application exists only after the started application initiates the networking function creation request; and if the first PDU session does not exist, the first PDU session needs to be newly established. As a result, a comparatively long time is consumed from initiating the networking function creation request by the started application to successful networking function creation.

In another possible implementation, after adding the first mapping relationship to the mapping table and before obtaining the interface name of the first PDU session from the mapping table, the terminal device receives the networking function creation request initiated by the started application, and after obtaining the interface name of the first PDU session from the mapping table, determines that the networking function creation initiated by the started application succeeds.

In this embodiment, the terminal device determines that the first PDU session corresponding to the started application exists or the first PDU session corresponding to the started application is successfully established; and if the networking function creation request initiated by the started application is received in this case, the terminal device may determine that the networking function creation initiated by the started application succeeds, and return a response indicating that the networking function creation succeeds to the started application.

In other words, in this embodiment, after the started application is started, the terminal device determines whether the first PDU session corresponding to the started application exists; and if the first PDU session does not exist, the terminal device newly establishes the first PDU session. In other words, the started application initiates the networking function creation request only when it is determined that the first PDU session corresponding to the started application exists. Therefore, a comparatively short time is consumed from initiating the networking function creation request by the started application to successful networking function creation.

Optionally, currently, in an Android system in the prior art, there is usually a time of several seconds between startup of an application and initiation of a networking function creation request. In this period of time, the application performs an operation such as internal caching of a system, and the application does not perform a networking operation, that is, does not initiate a networking function creation request.

Correspondingly, in this embodiment of this application, the terminal device routes the to-be-transmitted data of the started application to the first PDU session by using the interface name of the first PDU session only when determining that a networking function of the started application is successfully created, thereby implementing data transmission.

In the data transmission method provided in this embodiment of this application, when the URSP rule parameter of the started application is obtained and no PDU session parameter matching the URSP rule parameter exists in the mapping table of the terminal device, the first PDU session corresponding to the started application is established with the network device through the modem module, the interface name of the first PDU session is added to the routing table, the first mapping relationship including the mapping relationship between the session parameter of the first PDU session and the interface name of the first PDU session is added to the mapping table, and the to-be-transmitted data of the started application is routed to the first PDU session by using the interface name of the first PDU session. In addition to implementing data transmission, this further provides a solution about how a terminal device establishes a corresponding PDU session based on an obtained URSP rule parameter.

Optionally, in this embodiment of this application, the URSP rule parameter of the started application may be stored in the application platform module and the modem module of the terminal device, or may be stored only in the modem module of the terminal device, in other words, the URSP rule information obtained by the terminal device from the network device may be stored in the application platform module and the modem module, or may be stored only in the modem module. If storage locations of the URSP rule information are different, implementation solutions in which the terminal device establishes a corresponding PDU session based on the URSP rule information are different.

The following describes the technical solutions of this application in detail based on a storage location of the URSP rule information.

Figure 3:
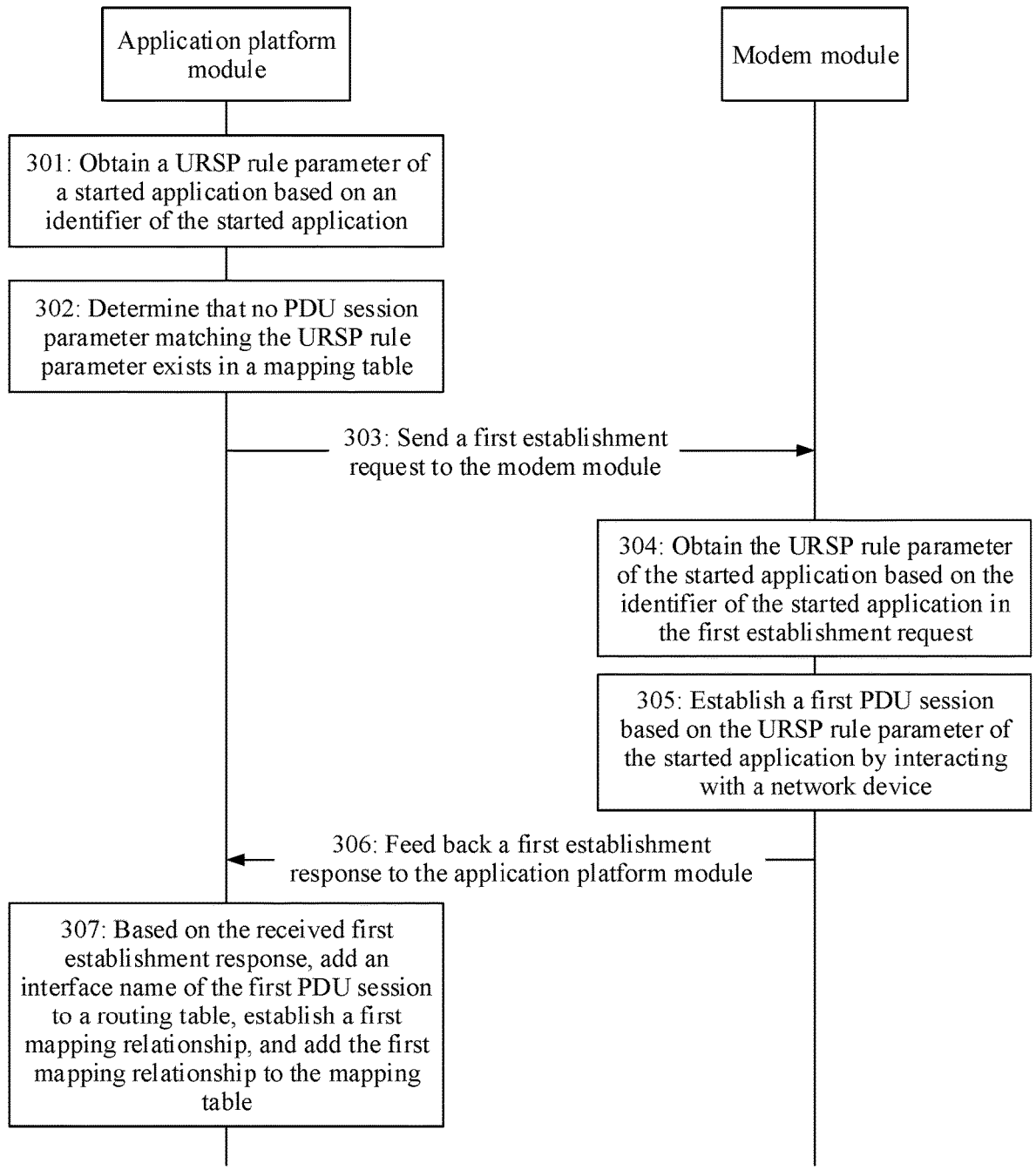
FIG. 3 is a schematic interaction diagram of Embodiment 2 of a data transmission method according to an embodiment of this application.
Figure 4:
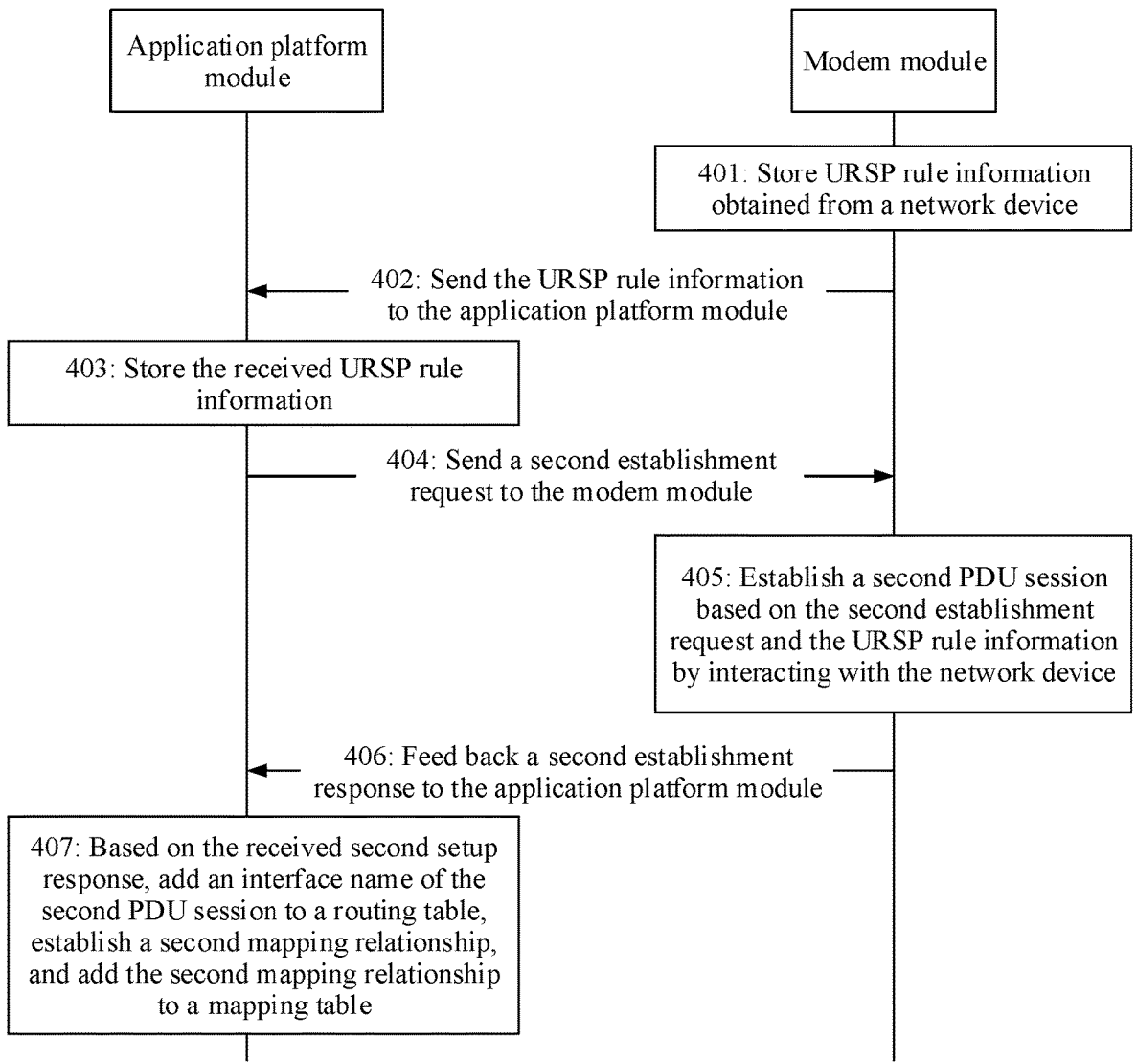
FIG. 4 is a schematic interaction diagram of Embodiment 3 of a data transmission method according to an embodiment of this application.

Optionally, when the URSP rule information is stored in the application platform module and the modem module, the data transmission method provided in this embodiment of this application may be specifically implemented by using the following embodiments shown in FIG. 3 and FIG. 4. Optionally, the following embodiments are described by using interaction between the application platform module and the modem module in the terminal device.

FIG. 3 is a schematic interaction diagram of Embodiment 2 of a data transmission method according to an embodiment of this application. Optionally, as shown in FIG. 3, in this embodiment, step 201 (obtain a URSP rule parameter of a started application) may be implemented by using the following step 301.

Step 301: An application platform module obtains the URSP rule parameter of the started application based on an identifier of the started application.

In this embodiment, a terminal device sends a registration request to a network device on a 5G network by using a modem module; correspondingly, the network device returns URSP rule information in a registration response, or the network device sends URSP rule information to the terminal device by using a configuration update procedure; and the terminal device stores the URSP rule information in the application platform module and the modem module. Therefore, the application platform module of the terminal device may obtain the URSP rule parameter of the started application through an internal search based on the identifier of the started application.

Further, as shown in FIG. 3, in this embodiment, step 202 (if no PDU session parameter matching the URSP rule parameter exists in the mapping table, establish a first PDU session with the network device through the modem module) may be implemented by using the following steps.

Step 302: The application platform module determines that no PDU session parameter matching the URSP rule parameter exists in the mapping table.

Optionally, in an embodiment, the application platform module determines whether the first PDU session corresponding to the started application exists. Specifically, if the application platform module determines that none of rule parameters in the URSP rule parameter can match a PDU session parameter in the mapping table, it is considered that the first PDU session corresponding to the started application does not exist. In this case, the first PDU session needs to be established.

Step 303: The application platform module sends a first establishment request to the modem module.

The first establishment request is used to request to establish the first PDU session. The first establishment request includes the identifier of the started application.

Before a PDU session is established, the application platform module cannot directly interact with the network device. Therefore, when the first PDU session is being newly established, the first PDU session needs to be established through interaction between the modem module and the network device. Specifically, the application platform module sends the first establishment request to the modem module, to request to establish the first PDU session. To enable the modem module to establish the first PDU session in a targeted manner, the first request needs to carry the identifier of the started application.

Step 304: The modem module obtains the URSP rule parameter of the started application based on the identifier of the started application in the first establishment request.

In the technical solution corresponding to this embodiment, the URSP rule information obtained from the network device is stored in the application platform module and the modem module. Therefore, after obtaining and receiving the first establishment request, the modem module may obtain the URSP rule parameter of the started application through an internal search based on the identifier of the started application in the first establishment request.

Step 305: The modem module establishes the first PDU session based on the URSP rule parameter of the started application by interacting with the network device.

After obtaining the URSP rule parameter of the started application, the modem module sends a first PDU session establishment request to the network device. The network device marks the URSP rule parameter of the started application on a network, and feeds back a first PDU session establishment response. After the modem module receives the first PDU session establishment response, the first PDU session is successfully established.

Step 306: The modem module feeds back a first establishment response to the application platform module.

The first establishment response is used to indicate that the first PDU session is successfully established. The first establishment response includes an interface name of the first PDU session and a session parameter of the first PDU session.

After the first PDU session is successfully established, the modem module feeds back the first establishment response to the application platform module, to notify the application platform module that the first PDU session is successfully established. Correspondingly, the first establishment response may include a related parameter of the first PDU session, for example, the session parameter of the first PDU session and the interface name of the first PDU session. Optionally, the first application establishment response may further include the identifier of the started application, so that the application platform module accurately locates the corresponding started application.

Correspondingly, step 203 (add an interface name of the first PDU session to the routing table, and add a first mapping relationship to the mapping table) may include the following step 307.

Step 307: Based on the received first establishment response, the application platform module adds the interface name of the first PDU session to the routing table, establishes the first mapping relationship, and adds the first mapping relationship to the mapping table.

In this embodiment, after the application platform module receives the first establishment response, to implement, in a subsequent use process, a solution of determining, based on a URSP rule parameter of an application, whether a corresponding PDU session exists, the application platform module needs to establish the first mapping relationship, and add the first mapping relationship to the mapping table. The first mapping relationship includes a mapping relationship between the session parameter of the first PDU session and the interface name of the first PDU session. In addition, to help the application platform module of the terminal device route data of the started application to the first PDU session after determining that the first PDU session exists or the first PDU session is established, the application platform module needs to add the interface name of the first PDU session in the first establishment response to the routing table.

In the data transmission method provided in this embodiment of this application, the application platform module of the terminal device obtains the URSP rule parameter of the started application; determines whether the first PDU session corresponding to the started application exists; and when the first PDU session does not exist, sends the first establishment request to the modem module, receives the first establishment response, and based on the first establishment response, adds the interface name of the first PDU session to the routing table, establishes the first mapping relationship, and adds the first mapping relationship to the mapping table. In this technical solution, the URSP rule information is stored in the application platform module and the modem module, and how the application platform module establishes a corresponding PDU session with the network device based on the URSP rule parameter through the modem module is described in detail. An implementation solution is simple and easy to implement, and data transmission efficiency is high.

FIG. 4 is a schematic interaction diagram of Embodiment 3 of a data transmission method according to an embodiment of this application. As shown in FIG. 4, before step 201 (obtain a URSP rule parameter of a started application), the data transmission method provided in this embodiment of this application may further include the following steps.

Step 401: A modem module stores URSP rule information obtained from a network device.

After a terminal device is powered on, the terminal device sends a registration request to the network device by using the internal modem module. After registering the terminal device with a 5G network, the network device sends the URSP rule information of the terminal device to the modem module by using a registration response, so that the modem module stores the URSP rule information; or sends the URSP rule information of the terminal device to the modem module by using a configuration update procedure, so that the modem module stores the URSP rule information.

Step 402: The modem module sends the URSP rule information to an application platform module.

In a possible implementation of this embodiment, the terminal device may store the URSP rule information in both the modem module and the application platform module. Therefore, after storing the URSP rule information, the modem module further sends the URSP rule information to the application platform module.

Step 403: The application platform module stores the received URSP rule information.

After receiving the URSP rule information sent by the modem module, the application platform module stores the URSP rule information.

Optionally, because the URSP rule information has been classified on the network, after receiving and storing the URSP rule information, the application platform module obtains URSP rule parameters with different precedences, and may further obtain a URSP rule parameter with a highest precedence in different URSP rule parameters. The URSP rule parameter with the highest precedence and a default URSP rule parameter are session parameters of a second PDU session. The session parameters of the second PDU session may not include a parameter value, or may include one or more parameter values. However, at least one of the different URSP rule parameters has a parameter value.

Further, in this embodiment, as shown in FIG. 4, after step 403, the data transmission method may further include the following steps.

Step 404: The application platform module sends a second establishment request to the modem module.

The second establishment request is used to request to establish the second PDU session, and the second PDU session corresponds to an application corresponding to a URSP rule parameter with a highest precedence and/or a default URSP rule parameter in the URSP rule information.

Optionally, after obtaining the URSP rule information, the application platform module of the terminal device automatically initiates the second establishment request. To be specific, the application platform module sends the second establishment request to the modem module based on the URSP rule parameter with the highest precedence and/or the default URSP rule parameter in the URSP rule information, to establish the second PDU session. The second establishment request carries content such as network slice selection information, session continuity mode selection information, access type information, and data network name selection information.

It should be noted that the URSP rule information may include one or more URSP rule parameters with highest precedences and/or default URSP rule parameters. This may be determined based on an actual case. When the URSP rule information includes a plurality of URSP rule parameters with highest precedences and/or default URSP rule parameters, the application platform module sends a plurality of second establishment requests to the modem module, to establish a plurality of second PDU sessions.

Step 405: The modem module establishes the second PDU session based on the second establishment request and the URSP rule information by interacting with the network device.

According to the received second establishment request and based on the URSP rule information stored in the modem module, the modem module sends a second PDU session establishment request to the network device, receives a second PDU session establishment response sent by the network device, and performs a second PDU session setup process. When a plurality of second PDU sessions need to be established, the modem module and the network device perform a plurality of second PDU session setup processes.

It should be noted that the network device performs allocation when a parameter value of a URSP rule parameter (for example, session continuity mode (SSC mode) selection information) in the URSP rule information is empty.

Step 406: The modem module feeds back a second establishment response to the application platform module.

The second establishment response is used to indicate that the second PDU session is successfully established, and the second establishment response includes an interface name of the second PDU session and a session parameter of the second PDU session.

In this embodiment, after the second PDU session is successfully established, the modem module feeds back the second establishment response to the application platform module, to notify the application platform module that the second PDU session is successfully established. The second establishment response includes a related parameter of the second PDU session, for example, the session parameter of the second PDU session and the interface name of the second PDU session. Optionally, the session parameter of the second PDU session includes parameter information allocated by the network device to the second PDU session.

Step 407: Based on the received second establishment response, the application platform module adds the interface name of the second PDU session to a routing table, establishes a second mapping relationship, and adds the second mapping relationship to a mapping table.

The second mapping relationship includes a mapping relationship between the session parameter of the second PDU session and the interface name of the second PDU session.

After receiving the second establishment response, the application platform module needs to establish the second mapping relationship, and add the second mapping relationship to the mapping table. The second mapping relationship includes the mapping relationship between the session parameter of the second PDU session and the interface name of the second PDU session. In addition, to help the application platform module of the terminal device route data of a corresponding application to the second PDU session after determining that the second PDU session exists or the second PDU session is established, the application platform module needs to add the interface name of the second PDU session in the second establishment response to the routing table.

In the data transmission method provided in this embodiment, the modem module stores the URSP rule information obtained from the network device and sends the URSP rule information to the application platform module; the application platform module stores the received URSP rule information, and sends the second establishment request to the modem module, to request to establish the second PDU session, where the second PDU session corresponds to the application corresponding to the URSP rule parameter with the highest precedence and/or the default URSP rule parameter in the URSP rule information; the modem module establishes the second PDU session based on the second establishment request and the URSP rule information by interacting with the network device, feeds back the second establishment response to the application platform module to indicate that the second PDU session is successfully established; and based on the received second establishment response, the application platform module adds the interface name of the second PDU session to the routing table, establishes the second mapping relationship, and adds the second mapping relationship to the mapping table, where the second mapping relationship includes the mapping relationship between the session parameter of the second PDU session and the interface name of the second PDU session. This technical solution describes a solution about how the application platform module and the modem module establish a PDU session based on the URSP rule information when the URSP rule information is stored in the application platform module and the modem module, thereby resolving a problem that how a terminal establishes a PDU session according to a URSP is not mentioned in the prior art.

Figure 5:
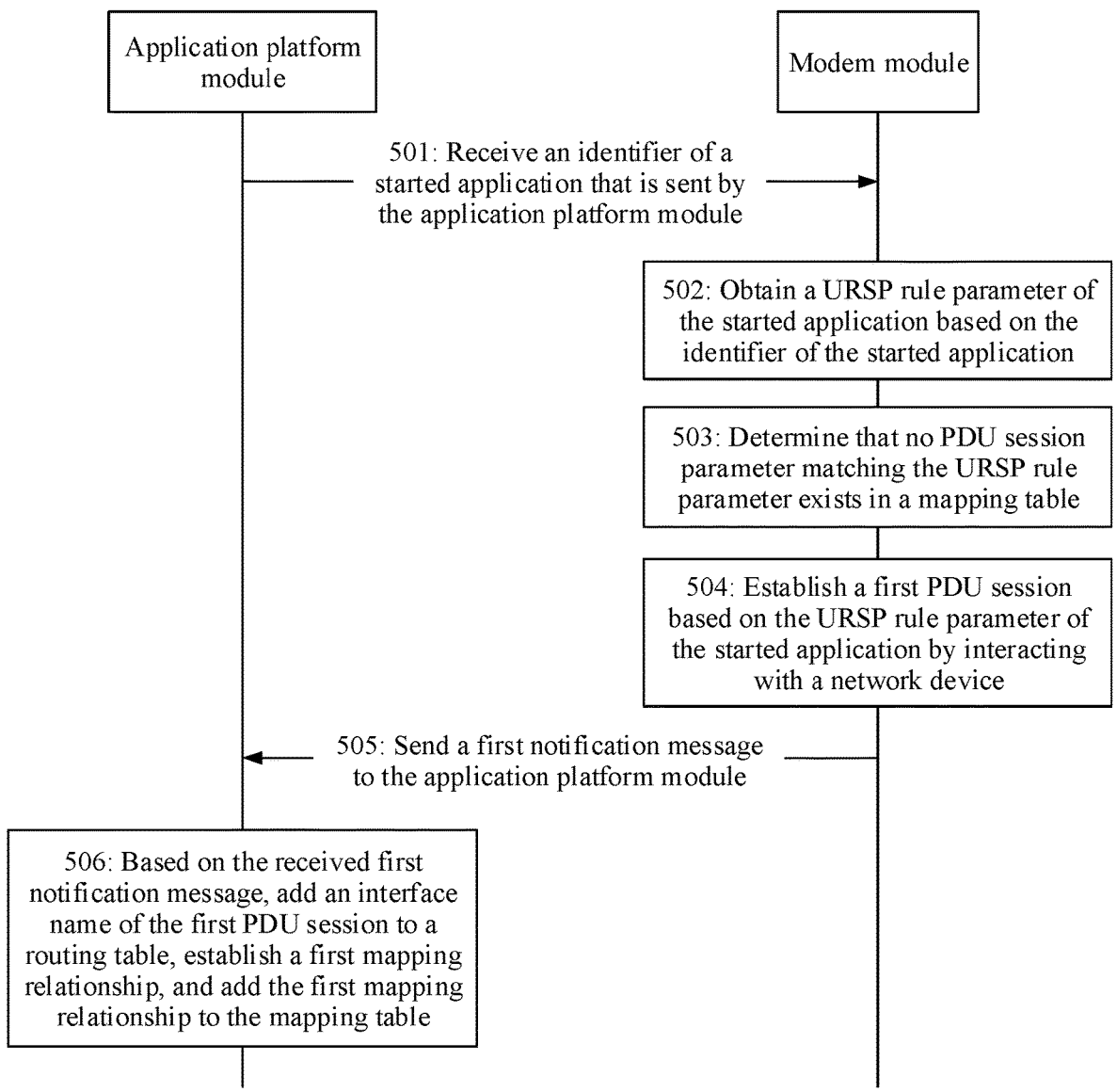
FIG. 5 is a schematic interaction diagram of Embodiment 4 of a data transmission method according to an embodiment of this application.
Figure 6:
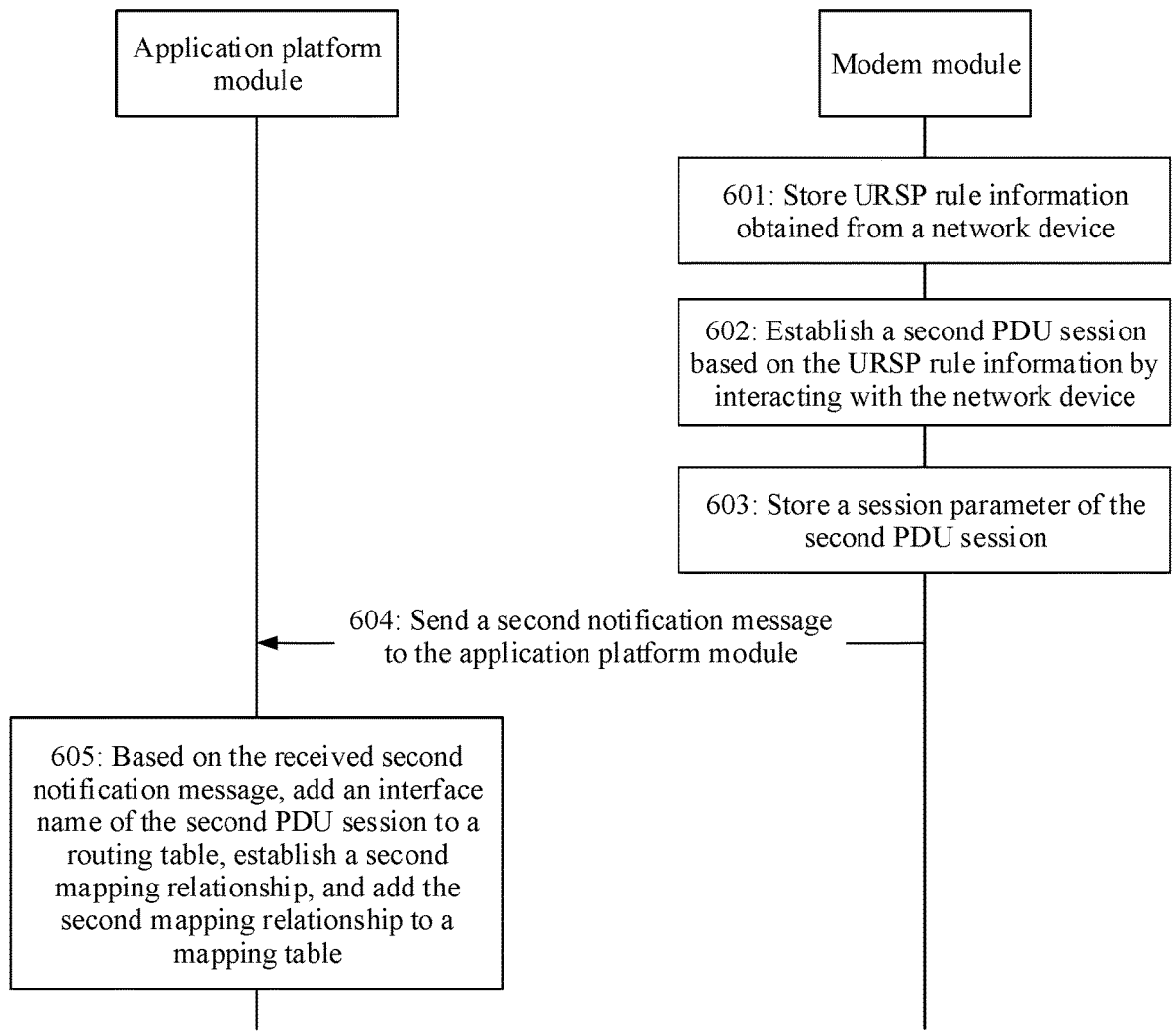
FIG. 6 is a schematic interaction diagram of Embodiment 5 of a data transmission method according to an embodiment of this application.

Optionally, when the URSP rule information is stored only in the modem module, the data transmission method provided in this embodiment of this application may be specifically implemented by using the following embodiments shown in FIG. 5 and FIG. 6. Optionally, the following embodiments are described by using interaction between the application platform module and the modem module in the terminal device.

FIG. 5 is a schematic interaction diagram of Embodiment 4 of a data transmission method according to an embodiment of this application. Optionally, as shown in FIG. 5, in this embodiment, step 201 (obtain a URSP rule parameter of a started application) may be implemented by using the following step 501 and step 502.

Step 501: A modem module receives an identifier of the started application that is sent by an application platform module.

Optionally, in this embodiment, because URSP rule information is stored only in the modem module, when the started application installed on a terminal device needs to transmit data, the application platform module sends the identifier of the started application to the modem module, so that the modem module performs a corresponding operation based on the received identifier of the started application.

Step 502: The modem module obtains the URSP rule parameter of the started application based on the identifier of the started application.

Optionally, the terminal device stores, in the modem module, the URSP rule information returned by a network device. Therefore, after receiving the identifier of the started application, the modem module searches the stored URSP rule information based on the identifier of the started application, to obtain the URSP rule parameter of the started application. For a specific meaning of the URSP rule parameter, refer to the descriptions in step 201 in the embodiment shown in FIG. 2. Details are not described herein again.

Optionally, as shown in FIG. 5, in this embodiment, step 202 (if no PDU session parameter matching the URSP rule parameter exists in the mapping table, establish a first PDU session with the network device through the modem module) may be implemented by using the following steps 503 to 505.

Step 503: The modem module determines that no PDU session parameter matching the URSP rule parameter exists in the mapping table.

Optionally, in this embodiment, the modem module may determine whether the first PDU session corresponding to the started application exists. Specifically, if the modem module determines that none of rule parameters in the URSP rule parameter of the started application can match a PDU session parameter in the mapping table, it is considered that the first PDU session corresponding to the started application does not exist. In this case, the first PDU session needs to be established.

It should be noted that, for a matching process, if a value of a rule parameter in the URSP rule parameter is empty, it may be considered that the rule parameter in the URSP rule parameter may match any value of the rule parameter in the PDU session.

Step 504: The modem module establishes the first PDU session based on the URSP rule parameter of the started application by interacting with the network device.

When determining that the first PDU session corresponding to the started application does not exist, the modem module may send a first PDU session establishment request to the network device based on the obtained URSP rule parameter of the started application. The network device establishes a PDU session based on the URSP rule parameter of the started application, and feeds back a first PDU session establishment response. After the modem module receives the first PDU session establishment response, the first PDU session is successfully established.

Step 505: The modem module sends a first notification message to the application platform module.

The first notification message is used to indicate that the first PDU session is successfully established. The first notification message includes an interface name of the first PDU session and a session parameter of the first PDU session.

After the first PDU session is successfully established, the modem module sends the first notification message to the application platform module, to notify the application platform module that the first PDU session is successfully established. Optionally, the first notification message includes a related parameter of the first PDU session, for example, the session parameter of the first PDU session and the interface name of the first PDU session. Specific content of the first notification message is not limited in this embodiment of this application, and the first notification message may further include another parameter based on an actual case.

Correspondingly, step 203 (add an interface name of the first PDU session to the routing table, and add a first mapping relationship to the mapping table) may be implemented by using the following step 506.

Step 506: Based on the received first notification message, the application platform module adds the interface name of the first PDU session to the routing table, establishes the first mapping relationship, and adds the first mapping relationship to the mapping table.

In this embodiment, the routing table stores an interface name of a PDU session corresponding to each application, and the mapping table stores a mapping relationship between an interface name and a session parameter of each PDU session. This provides an implementation possibility for subsequent data transmission of each application. Optionally, after receiving the first notification message sent by the modem module, the application platform module may add the interface name of the first PDU session in the first notification message to the routing table, and correspondingly, establish the first mapping relationship based on the session parameter of the first PDU session and the interface name of the first PDU session, and add the first mapping relationship to a first mapping table.

In the data transmission method provided in this embodiment of this application, the modem module receives the identifier of the started application that is sent by the application platform module, obtains the URSP rule parameter of the started application based on the identifier of the started application, and when determining that no PDU session parameter matching the URSP rule parameter exists in the mapping table, establishes the first PDU session based on the URSP rule parameter of the started application by interacting with the network device, and then sends the first notification message to the application platform module, to indicate that the first PDU session is successfully established; and based on the received first notification message, the application platform module adds the interface name of the first PDU session in the first notification message to the routing table, establishes the first mapping relationship based on the session parameter of the first PDU session and the interface name of the first PDU session that are in the first notification message, and adds the first mapping relationship to the mapping table. In this technical solution, when the URSP rule information is stored only in the modem module, how the modem module establishes a corresponding PDU session based on the URSP rule parameter is described in detail. This provides an implementation possibility for subsequent data transmission of the started application. In addition, the URSP rule information is stored only in the modem module, thereby enhancing security of the URSP rule information.

FIG. 6 is a schematic interaction diagram of Embodiment 5 of a data transmission method according to an embodiment of this application. As shown in FIG. 6, before step 201 (obtain a URSP rule parameter of a started application), the data transmission method provided in this embodiment of this application may further include the following steps.

Step 601: A modem module stores URSP rule information obtained from a network device.

Optionally, after a terminal device is powered on, the modem module sends a registration request to the network device, so that the network device registers the terminal device with a network, and then sends, to the modem module by using a registration response, URSP rule information of each application installed on the terminal device. Correspondingly, the modem module receives the registration response and stores the obtained URSP rule information. Optionally, the network device may alternatively send the URSP rule information to the terminal device by using a configuration update procedure.

Optionally, in this embodiment, as shown in FIG. 6, after step 601, the data transmission method may further include the following steps.

Step 602: The modem module establishes a second PDU session based on the URSP rule information by interacting with the network device.

Optionally, after obtaining the URSP rule information, the modem module automatically initiates a second PDU session setup process based on a precedence of the URSP rule information, that is, performs the second PDU session setup process based on the URSP rule information. Specifically, the modem module sends a second PDU session establishment request to the network device, and after a second PDU session establishment response sent by the network device is received, the second PDU session is successfully established.

It should be noted that the second PDU session corresponds to an application corresponding to a URSP rule parameter with a highest precedence and/or a default URSP rule parameter in the URSP rule information. Therefore, the modem module may request to establish a plurality of second PDU sessions. Therefore, the modem module and the network device need to perform a plurality of second PDU session setup processes.

Likewise, the network device performs allocation when a parameter value of a URSP rule parameter (for example, session continuity mode selection information) in the URSP rule information is empty.

Step 603: The modem module stores a session parameter of the second PDU session.

Optionally, after the second PDU session is successfully established, the modem module may store the session parameter of the second PDU session, for example, content such as network slice selection information, session continuity mode selection information, and data network name selection information of the second PDU session, so that the modem module may determine, in a subsequent use process based on an obtained URSP rule parameter of an application, whether a session parameter matching the URSP rule parameter exists, that is, determine whether a PDU session corresponding to the application exists.

Step 604: The modem module sends a second notification message to an application platform module.

The second notification message is used to indicate that the second PDU session is successfully established, and the second notification message includes an interface name of the second PDU session and the session parameter of the second PDU session.

Optionally, after successfully establishing the second PDU session by interacting with the network device, the modem module sends the second notification message to the application platform module, to notify the application platform module of an application for which the second PDU session is successfully established. Optionally, the second notification message includes a related parameter of the second PDU session and an identifier of an application corresponding to the second PDU session. Optionally, the related parameter of the second PDU session may include the session parameter of the second PDU session and the interface name of the second PDU session, and the session parameter of the second PDU session may include parameter information allocated by the network device to the second PDU session, or the like.

Step 605: Based on the received second notification message, the application platform module adds the interface name of the second PDU session to a routing table, establishes a second mapping relationship, and adds the second mapping relationship to a mapping table.

The second mapping relationship includes a mapping relationship between the session parameter of the second PDU session and the interface name of the second PDU session.

In this embodiment, after the application platform module receives the second notification message, to subsequently conveniently determine a relationship between a session parameter of a PDU session and an interface name of the PDU session, the application platform module needs to establish the second mapping relationship, and add the second mapping relationship to the mapping table, where the second mapping relationship is the mapping relationship between the session parameter of the second PDU session and the interface name of the second PDU session; and to help the application platform module of the terminal device route data of a corresponding application to the second PDU session after determining that the second PDU session exists or the second PDU session is established, the application platform module further needs to add the interface name of the second PDU session in the second notification message to the routing table.

In the data transmission method provided in this embodiment of this application, the modem module stores the URSP rule information obtained from the network device, establishes the second PDU session based on the URSP rule information by interacting with the network device, stores the session parameter of the second PDU session, and sends the second notification message to the application platform module to indicate that the second PDU session is successfully established, where the second notification message includes the interface name of the second PDU session and the session parameter of the second PDU session; and correspondingly, based on the received second notification message, the application platform module adds the interface name of the second PDU session to the routing table, establishes the second mapping relationship, and adds the second mapping relationship to the mapping table. This technical solution describes a solution about how the modem module establishes a PDU session based on the URSP rule information when the URSP rule information is stored only in the modem module, thereby resolving a problem that how a terminal establishes a PDU session according to a URSP is not mentioned in the prior art.

Figure 7:
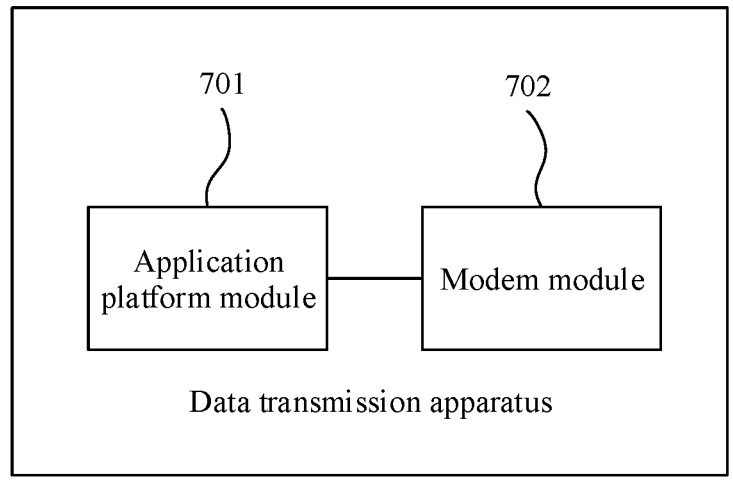
FIG. 7 is a schematic structural diagram of a data transmission apparatus according to an embodiment of this application.

FIG. 7 is a schematic structural diagram of a data transmission apparatus according to an embodiment of this application. The data transmission apparatus is applied to a terminal device. The terminal device stores a mapping table and a routing table. As shown in FIG. 7, the data transmission apparatus provided in this embodiment may include an application platform module 701 and a modem module 702.

The application platform module 701 is configured to obtain a URSP rule parameter of a started application.

The modem module 702 is configured to establish a first PDU session through a network device when no protocol data unit PDU session parameter matching the URSP rule parameter exists in the mapping table of the terminal device. The first PDU session corresponds to the started application.

The application platform module 701 is configured to: add an interface name of the first PDU session to the routing table, add a first mapping relationship to the mapping table, and route to-be-transmitted data of the started application to the first PDU session by using the interface name of the first PDU session.

The first mapping relationship includes a mapping relationship between a session parameter of the first PDU session and the interface name of the first PDU session.

Optionally, in a possible implementation, the application platform module 701 is further configured to send a first establishment request to the modem module 702 when no PDU session parameter matching the URSP rule parameter exists in the mapping table.

The first establishment request is used to request to establish the first PDU session. The first establishment request includes an identifier of the started application.

The modem module 702 is specifically configured to: obtain the URSP rule parameter of the started application based on the identifier of the started application in the first establishment request, establish the first PDU session based on the URSP rule parameter of the started application by interacting with the network device, and return a first establishment response to the application platform module 701.

The first establishment response is used to indicate that the first PDU session is successfully established. The first establishment response includes the interface name of the first PDU session and the session parameter of the first PDU session.

Optionally, in the foregoing embodiment, that the application platform module 701 is configured to add an interface name of the first PDU session to the routing table and add a first mapping relationship to the mapping table is specifically as follows:

The application platform module 701 is configured to: based on the received first establishment response, add the interface name of the first PDU session to the routing table, establish the first mapping relationship, and add the first mapping relationship to the mapping table.

Optionally, in another embodiment of this application, the modem module 702 is further configured to: before the application platform module 701 obtains the user equipment route selection policy URSP rule parameter of the started application, store URSP rule information obtained from the network device, and send the URSP rule information to the application platform module 701.

Correspondingly, the application platform module 701 is further configured to store the received URSP rule information.

Optionally, in this embodiment, the application platform module 701 is further configured to send a second establishment request to the modem module 702. The second establishment request is used to request to establish a second PDU session. The second PDU session corresponds to an application corresponding to a URSP rule parameter with a highest precedence and/or a default URSP rule parameter in the URSP rule information.

The modem module 702 is further configured to establish the second PDU session based on the second establishment request and the URSP rule information by interacting with the network device.

The modem module 702 is further configured to feed back a second establishment response to the application platform module 701. The second establishment response is used to indicate that the second PDU session is successfully established. The second establishment response includes an interface name of the second PDU session and a session parameter of the second PDU session.

The application platform module 701 is configured to: based on the received second establishment response, add the interface name of the second PDU session to the routing table, establish a second mapping relationship, and add the second mapping relationship to the mapping table. The second mapping relationship includes a mapping relationship between the session parameter of the second PDU session and the interface name of the second PDU session.

Optionally, in still another embodiment of this application, the application platform module 701 is further configured to: before routing the to-be-transmitted data of the started application to the first PDU session by using the interface name of the first PDU session, determine that networking function creation initiated by the started application succeeds.

Optionally, in yet another embodiment of this application, the application platform module 701 is further configured to: before obtaining a URSP rule parameter of a started application, receive a networking function creation request initiated by the started application, and after obtaining the interface name of the first PDU session from the mapping table, determine that the networking function creation initiated by the started application succeeds.

Optionally, in yet another embodiment of this application, the application platform module 701 is further configured to: after adding the first mapping relationship to the mapping table and before obtaining the interface name of the first PDU session from the mapping table, receive a networking function creation request initiated by the started application, and after obtaining the interface name of the first PDU session from the mapping table, determine that the networking function creation initiated by the started application succeeds.

Optionally, in yet another embodiment of this application, the application platform module 701 is further configured to: determine whether a PDU session parameter matching the URSP rule parameter exists in the mapping table, and when a PDU session parameter matching the URSP rule parameter exists in the mapping table, determine that the first PDU session exists.

Optionally, in this embodiment, that the application platform module 701 is configured to determine whether a PDU session parameter matching the URSP rule parameter exists in the mapping table is specifically as follows:

The application platform module 701 is configured to: sequentially match URSP rule parameters of the started application with a PDU session parameter in the mapping table in descending order of precedences of the URSP rule parameters, and determine, from the URSP rule parameters, a rule parameter matching the PDU session parameter in the mapping table, or determine that no rule parameter matching the PDU session parameter in the mapping table exists in the URSP rule parameters.

Optionally, in yet another embodiment of this application, the application platform module 701 is further configured to: before obtaining the URSP rule parameter of the started application, route the to-be-transmitted data of the started application to a wireless local area network WLAN if it is determined that a seamless offload indication parameter in parameter information of the started application has a highest precedence.

The data transmission apparatus provided in this embodiment may be configured to perform the technical solutions in the method embodiments shown in FIG. 2, FIG. 3, and FIG. 4. Specific implementations and technical effects are similar. Details are not described herein again.

Figure 8:
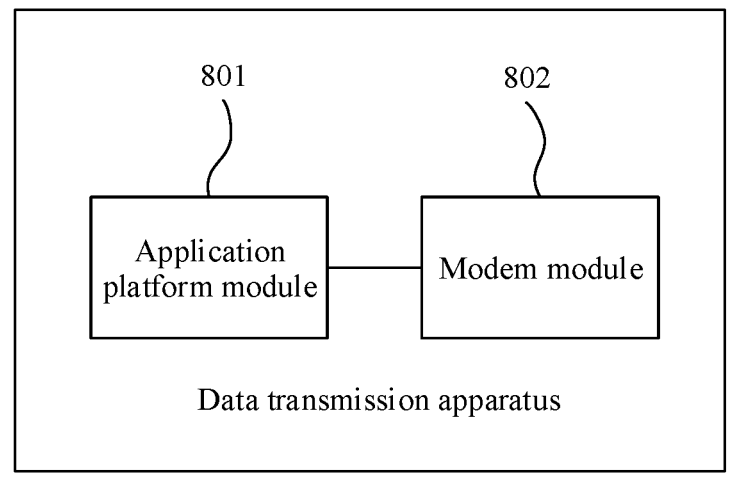
FIG. 8 is a schematic structural diagram of another data transmission apparatus according to an embodiment of this application.

FIG. 8 is a schematic structural diagram of another data transmission apparatus according to an embodiment of this application. The data transmission apparatus is applied to a terminal device. The terminal device stores a mapping table and a routing table. As shown in FIG. 8, the data transmission apparatus provided in this embodiment may include an application platform module 801 and a modem module 802.

The modem module 802 is configured to: obtain a user equipment route selection policy URSP rule parameter of a started application, establish a first PDU session through a network device when no protocol data unit PDU session parameter matching the URSP rule parameter exists in the mapping table, and send an interface name of the first PDU session and a session parameter of the first PDU session to the application platform module 801.

The application platform module 801 is configured to: receive the interface name of the first PDU session and the session parameter of the first PDU session that are sent by the modem module 802, add the interface name of the first PDU session to the routing table, add a first mapping relationship to the mapping table, and route to-be-transmitted data of the started application to the first PDU session by using the interface name of the first PDU session.

The first mapping relationship includes a mapping relationship between the session parameter of the first PDU session and the interface name of the first PDU session.

Optionally, in an embodiment of this application, that the modem module 802 is configured to obtain a user equipment route selection policy URSP rule parameter of a started application is specifically as follows:

The modem module 802 is configured to receive an identifier of the started application that is sent by the application platform module 801, and obtain the URSP rule parameter of the started application based on the identifier of the started application.

Optionally, in another embodiment of this application, the modem module 802 is further configured to: when no PDU session parameter matching the URSP rule parameter exists in the mapping table, establish the first PDU session based on the URSP rule parameter of the started application by interacting with the network device, and send a first notification message to the application platform module 801.

The first notification message is used to indicate that the first PDU session is successfully established. The first notification message includes the interface name of the first PDU session and the session parameter of the first PDU session.

Optionally, in the foregoing embodiment of this application, that the application platform module 801 is configured to add the interface name of the first PDU session to the routing table and add a first mapping relationship to the mapping table is specifically as follows:

The application platform module 801 is configured to: based on the received first notification message, add the interface name of the first PDU session to the routing table, establish the first mapping relationship, and add the first mapping relationship to the mapping table.

Optionally, in still another embodiment of this application, the modem module 802 is further configured to: before the user equipment route selection policy URSP rule parameter of the started application is obtained, store URSP rule information obtained from the network device.

Optionally, in the foregoing embodiment of this application, the modem module 802 is further configured to: establish a second PDU session based on the URSP rule information by interacting with the network device, store a session parameter of the second PDU session, and send a second notification message to the application platform module 801. The second notification message is used to indicate that the second PDU session is successfully established. The second notification message includes an interface name of the second PDU session and a session parameter of the second PDU session. The second PDU session corresponds to an application corresponding to a URSP rule parameter with a highest precedence and/or a default URSP rule parameter in the URSP rule information.

Correspondingly, the application platform module 801 is configured to: based on the received second notification message, add the interface name of the second PDU session to the routing table, establish a second mapping relationship, and add the second mapping relationship to the mapping table. The second mapping relationship includes a mapping relationship between the session parameter of the second PDU session and the interface name of the second PDU session.

Optionally, in yet another embodiment of this application, the application platform module 801 is further configured to: before routing the to-be-transmitted data of the started application to the first PDU session by using the interface name of the first PDU session, determine that networking function creation initiated by the started application succeeds.

Optionally, in yet another embodiment of this application, the application platform module 801 is further configured to: before obtaining a URSP rule parameter of a started application, receive a networking function creation request initiated by the started application, and after obtaining the interface name of the first PDU session from the mapping table, determine that the networking function creation initiated by the started application succeeds.

Optionally, in yet another embodiment of this application, the application platform module 801 is further configured to: after adding the first mapping relationship to the mapping table and before obtaining the interface name of the first PDU session from the mapping table, receive a networking function creation request initiated by the started application, and after obtaining the interface name of the first PDU session from the mapping table, determine that the networking function creation initiated by the started application succeeds.

Optionally, in yet another embodiment of this application, the modem module 802 is further configured to: determine whether a PDU session parameter matching the URSP rule parameter exists in the mapping table, and when a PDU session parameter matching the URSP rule parameter exists in the mapping table, determine that the first PDU session exists.

Optionally, in the foregoing embodiment of this application, that the modem module 802 is further configured to determine whether a PDU session parameter matching the URSP rule parameter exists in the mapping table is specifically as follows:

The modem module 802 is further configured to: sequentially match URSP rule parameters of the started application with a PDU session parameter in the mapping table in descending order of precedences of the URSP rule parameters, and determine, from the URSP rule parameters, a rule parameter matching the PDU session parameter in the mapping table, or determine that no rule parameter matching the PDU session parameter in the mapping table exists in the URSP rule parameters.

Optionally, in yet another embodiment of this application, the modem module 802 is further configured to: before the URSP rule parameter of the started application is obtained, route the to-be-transmitted data of the started application to a wireless local area network WLAN if it is determined that a seamless offload indication parameter in parameter information of the started application has a highest precedence.

The data transmission apparatus provided in this embodiment may be configured to perform the technical solutions in the method embodiments shown in FIG. 2, FIG. 5, and FIG. 6. Specific implementations and technical effects are similar. Details are not described herein again.

Figure 9:
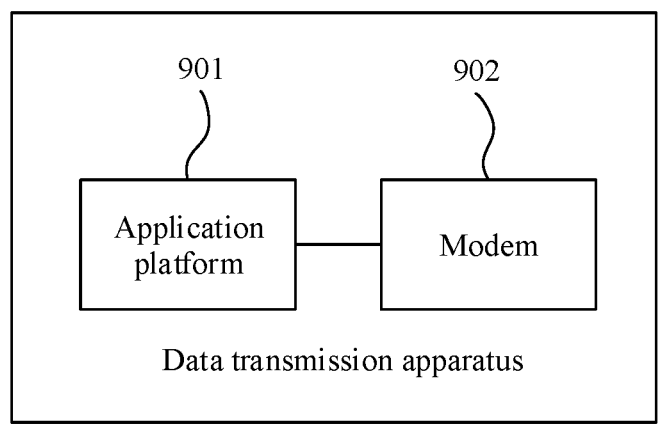
FIG. 9 is a schematic structural diagram of still another data transmission apparatus according to an embodiment of this application.

FIG. 9 is a schematic structural diagram of still another data transmission apparatus according to an embodiment of this application. The data transmission apparatus provided in this embodiment includes an application platform 901 and a modem 902. The application platform 901 may correspond to the application platform module in the embodiment shown in FIG. 7. The modem 902 may correspond to the modem module in the embodiment shown in FIG. 7.

Optionally, the application platform 901 and the modem 902 each may include a processor and a transceiver; or processing functions of the application platform 901 and the modem 902 are integrated into a processor, and sending and receiving functions of the application platform 901 and the modem 902 are integrated into a transceiver.

Optionally, the data transmission apparatus may further include a memory. The memory is configured to store executable instructions of the application platform 901 and the modem 902. Optionally, the sending and receiving functions of the application platform 901 and the modem 902 may be implemented by a transmitter and a receiver that have independent functions. Both the application platform 901 and the modem 902 may be implemented in a form of an antenna or the like. This is not limited in this embodiment of this application. The application platform 901 and the modem 902 are configured to run a computer-executable instruction, so that the data transmission apparatus performs the steps of the data transmission methods in the embodiments shown in FIG. 2, FIG. 3, and FIG. 4.

Figure 10:
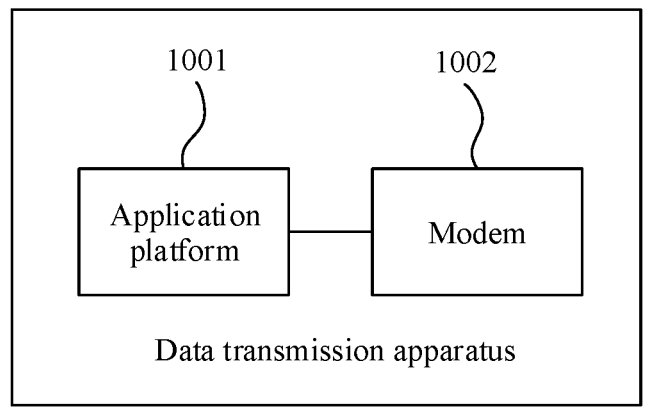
FIG. 10 is a schematic structural diagram of yet another data transmission apparatus according to an embodiment of this application.

FIG. 10 is a schematic structural diagram of yet another data transmission apparatus according to an embodiment of this application. The data transmission apparatus provided in this embodiment includes an application platform 1001 and a modem 1002. The application platform 1001 may correspond to the application platform module in the embodiment shown in FIG. 8, and the modem 1002 may correspond to the modem module in the embodiment shown in FIG. 8.

Optionally, the application platform 1001 and the modem 1002 each may include a processor and a transceiver; or processing functions of the application platform 1001 and the modem 1002 are integrated into a processor, and sending and receiving functions of the application platform 1001 and the modem 1002 are integrated into a transceiver.

Optionally, the data transmission apparatus may further include a memory. The memory is configured to store executable instructions of the application platform 1001 and the modem 1002. Optionally, the sending and receiving functions of the application platform 1001 and the modem 1002 may be implemented by a transmitter and a receiver that have independent functions. Both the application platform 1001 and the modem 1002 may be implemented in a form of an antenna or the like. This is not limited in this embodiment of this application. The application platform 1001 and the modem 1002 are configured to run a computer-executable instruction, so that the data transmission apparatus performs the steps of the data transmission methods in the embodiments shown in FIG. 2, FIG. 5, and FIG. 6.

Optionally, an embodiment of this application provides a readable storage medium. The readable storage medium stores an instruction. When the instruction is run on a computer, the computer is enabled to perform the methods in the embodiments shown in FIG. 2, FIG. 3, and FIG. 4; or when the instruction is run on a computer, the computer is enabled to perform the methods in the embodiments shown in FIG. 2, FIG. 5, and FIG. 6.

Optionally, an embodiment of this application provides a chip for running an instruction. The chip is configured to perform the methods in the embodiments shown in FIG. 2, FIG. 3, and FIG. 4; or when the instruction is run on a computer, the computer is enabled to perform the methods in the embodiments shown in FIG. 2, FIG. 5, and FIG. 6.

It should be noted that, it should be understood that division of the modules of the foregoing apparatus is merely logical function division. In an actual implementation, all or some of the modules may be integrated into one physical entity, or the modules may be physically separated. In addition, all these modules may be implemented in a form of software invoked by a processing element; or all these modules may be implemented in a form of hardware; or some modules may be implemented in a form of software invoked by a processing element, and some modules may be implemented in a form of hardware. For example, a determining module may be an independently disposed processing element; or may be integrated into a chip of the foregoing apparatus for implementation; or may be stored in a memory of the foregoing apparatus in a form of program code, so that the program code is invoked by a processing element of the foregoing apparatus to perform a function of the determining module. Implementations of other modules are similar. In addition, all or some of these modules may be integrated, or these modules may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing methods, for example, one or more application-specific integrated circuits (application specific integrated circuit, ASIC), one or more microprocessors (digital signal processor, DSP), or one or more field programmable gate arrays (field programmable gate array, FPGA). For another example, when one of the foregoing modules is implemented in a form of scheduling program code by a processing element, the processing element may be a general-purpose processor, for example, a central processing unit (central processing unit, CPU) or another processor that can invoke the program code. For another example, these modules may be integrated and implemented in a form of a system-on-a-chip (system-on-a-chip, SOC).

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a readable storage medium or may be transmitted from a readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between associated objects. In a formula, the character "/" indicates a "division" relationship between associated objects.

It can be understood that various numbers in the embodiments of this application are merely used for differentiation for ease of description, and are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A data transmission method, implemented by a terminal device, wherein the data transmission method comprises:
   sending, an application platform of the terminal device, a first establishment request to a modem system of the terminal when no PDU session parameter matching the URSP rule parameter exists in a mapping table, wherein the first establishment request requests to establish the first PDU session comprises an identifier of the started application;
   obtaining, by the modem system, a user equipment route selection policy (URSP) rule parameter of a started application based on the identifier of the started application in the first establishment request;
   establishing, by the modem system, a first protocol data unit (PDU) session based on the URSP rule parameter of the started application by interacting with a network device when no PDU session parameter matching the URSP rule parameter exists in the mapping table of the terminal device, wherein the first PDU session corresponds to the started application;
   feeding back, by the modem system, a first establishment response to the application platform, wherein the first establishment response indicates that the first PDU session is successfully established, and wherein the first establishment response comprises a first interface name of the first PDU session and a first session parameter of the first PDU session;
   adding the first interface name of the first PDU session to a routing table of the terminal device;
   adding a first mapping relationship to the mapping table, wherein the first mapping relationship is between the first session parameter of the first PDU session and the first interface name of the first PDU session; and
   routing to-be-transmitted data of the started application to the first PDU session using the first interface name of the first PDU session.

2. The data transmission method of claim 1, further comprising:
   adding, by the application platform, the first interface name of the first PDU session to the routing table based on the first establishment response;
   establishing a second mapping relationship; and
   adding the second mapping relationship to the mapping table.

3. The data transmission method of claim 1, wherein before obtaining the URSP rule parameter of a started application, the data transmission method further comprises:
   storing, by the modem system, URSP rule information from the network device;
   sending the URSP rule information to an application platform of the terminal device; and storing, by the application platform, the URSP rule information.

4. The data transmission method of claim 3, further comprising:
   sending, by the application platform, a second establishment request to the modem system requesting to establish a second PDU session, wherein the second PDU session corresponds to an application corresponding to a second URSP rule parameter with a highest precedence or a default URSP rule parameter in the URSP rule information;
   establishing, by the modem system, the second PDU session based on the second establishment request and the URSP rule information by interacting with the network device;
   feeding back, by the modem system, a second establishment response to the application platform indicating that the second PDU session is successfully established, wherein the second establishment response comprises a second interface name of the second PDU session and a second session parameter of the second PDU session;
   adding, by the application platform, the second interface name to the routing table based on the second establishment response;
   establishing a second mapping relationship between the second session parameter and the second interface name; and
   adding the second mapping relationship to the mapping table.

5. The data transmission method of claim 1, further comprising:
   receiving, by the modem system, the identifier of the started application from an application platform of the terminal device; and
   obtaining the URSP rule parameter of the started application based on the identifier of the started application.

6. The data transmission method of claim 1, further comprising:
   establishing, by the modem system, the first PDU session based on the URSP rule parameter of the started application by interacting with the network device when no PDU session parameter matching the URSP rule parameter exists in the mapping table; and
   sending, by the modem system, a first notification message to an application platform of the terminal device indicating that the first PDU session is successfully established, wherein the first notification message comprises the first interface name and the first session parameter of the first PDU session.

7. The data transmission method of claim 6, further comprising:
   adding, by the application platform, the first interface name of the first PDU session to the routing table based on the first notification message;
   establishing the second mapping relationship; and
   adding the second mapping relationship to the mapping table.

8. The data transmission method of claim 1, wherein before obtaining the URSP rule parameter of a started application, the data transmission method further comprises storing, by the modem system, URSP rule information from the network device.

9. The data transmission method of claim 1, further comprising:
- establishing, by the modem system, a second PDU session based on URSP rule information by interacting with the network device,
- storing a second session parameter of the second PDU session, wherein the second PDU session corresponds to an application corresponding to a second URSP rule parameter with a highest precedence or a default URSP rule parameter in the URSP rule information;
- sending, by the modem system, a second notification message to an application platform of the terminal device indicating that the second PDU session is successfully established, wherein the second notification message comprises a second interface name and the second session parameter of the second PDU session;
- adding, by the application platform, the second interface name of the second PDU session to the routing table based on the second notification message;
- establishing a second mapping relationship between the second session parameter and the second interface name; and
- adding the second mapping relationship to the mapping table.

10. The data transmission method of claim 1, wherein before routing the to-be-transmitted data of the started application to the first PDU session, the data transmission method further comprises determining that networking function creation from the started application succeeds.

11. The data transmission method of claim 1, wherein before obtaining the URSP rule parameter, the data transmission method further comprises:
- receiving a networking function creation request from the started application;
- obtaining the first interface name of the first PDU session from the mapping table; and
- determining that the networking function creation request has succeeded.

12. The data transmission method of claim 1, wherein after adding the second mapping relationship to the mapping table, the data transmission method further comprises:
- receiving a networking function creation request from the started application;
- obtaining the first interface name of the first PDU session from the mapping table; and
- determining that the networking function creation succeeds.

13. The data transmission method of claim 1, wherein the first session parameter includes one of a network slice selection, a session continuity (SSC) mode selection, a data network name (DNN) selection, or an access type preference.

14. A data transmission apparatus comprising:
a memory configured to store a mapping table and a routing table;
an application platform configured to:
- obtain a user equipment route selection policy (URSP) rule parameter of a started application;
- send a first establishment request when no PDU session parameter matching the URSP rule parameter exists in the mapping table, wherein the first establishment request requests to establish a first protocol data unit (PDU) session and comprises an identifier of the started application; and a modem system configured to:
- obtain, by the modem system, the URSP rule parameter based on the identifier of the started application in the first establishment request;
- establish the first PDU session based on the URSP rule parameter of the started application by interacting with a network device when no PDU session parameter matching the URSP rule parameter exists in the mapping table, wherein the first PDU session corresponds to the started application; and
- send a first establishment response to the application platform, wherein the first establishment response indicates that the first PDU session is successfully established, and wherein the first establishment response comprises a first interface name and a first session parameter of the first PDU session, wherein the application platform is further configured to:
- add the first interface name of the first PDU session to the routing table;
- add a first mapping relationship to the mapping table, wherein the first mapping relationship is between the first session parameter of the first PDU session and the first interface name of the first PDU session; and
- route to-be-transmitted data of the started application to the first PDU session using the first interface name of the first PDU session.

15. A data transmission apparatus comprising:
a memory configured to store a mapping table and a routing table
an application platform; and
a modem system configured to:
- obtain a user equipment route selection policy (URSP) rule parameter of a started application based on an identifier of the started application in a first establishment request;
- establish a first protocol data unit (PDU) session based on the URSP rule parameter of the started application by interacting with a network device when no PDU session parameter matching the URSP rule parameter exists in the mapping table; and
- send, to the application platform, a first establishment response to the application platform, wherein the first establishment response indicates that the first PDU session is successfully established, and wherein the first establishment response comprises a first interface name of the first PDU session and a first session parameter of the first PDU session, wherein the application platform is configured to:
send the first establishment request to the modem system when no PDU session parameter matching the URSP rule parameter exists in the mapping table, wherein the first establishment request requests to establish the first PDU session and comprises the identifier of the started application;
receive, from the modem system, the first interface name of the first PDU session and the first session parameter of the first PDU session from the modem system;
add the first interface name of the first PDU session to the routing table;
add a first mapping relationship to the mapping table, wherein the first mapping relationship is between the first session parameter and the first interface name; and
route to-be-transmitted data of the started application to the first PDU session using the first interface name of the first PDU session.

16. The data transmission apparatus of claim 15, wherein the application platform is further configured to:
   add the first interface name to the routing table based on the first establishment response;
   establish the first mapping relationship; and
   add the first mapping relationship to the mapping table.

17. The data transmission apparatus of claim 15, wherein before the modem system obtaining the URSP rule parameter, the modem system is further configured to:
   store URSP rule information from the network device; and
   send the URSP rule information to the application platform, wherein the application platform is further configured to store the URSP rule information.

18. The data transmission apparatus of claim 15, wherein the modem system is further configured to:
   receive the identifier of the started application from the application platform; and
   obtain the URSP rule parameter based on the identifier of the started application.

19. The data transmission apparatus of claim 15, wherein the modem system is further configured to:
   interact with the network device to establish the first PDU session based on the URSP rule parameter when no PDU session parameter matching the URSP rule parameter exists in the mapping table; and
   send a first notification message to the application platform indicating that the first PDU session is successfully established, wherein the first notification message comprises the first interface name and the first session parameter.

20. The data transmission apparatus of claim 15, wherein the first session parameter includes one of a network slice selection, a session continuity (SSC) mode selection, a data network name (DNN) selection, or an access type preference.

* * * * *